United States Patent
Xu et al.

(10) Patent No.: US 12,120,302 B2
(45) Date of Patent: Oct. 15, 2024

(54) CODED REPRESENTATION OF HISTORY-BASED MOTION VECTOR PREDICTION TABLES

(71) Applicants: Beijing Bytedance Network Technology Co., Ltd., Beijing (CN); Bytedance Inc., Los Angeles, CA (US)

(72) Inventors: Jizheng Xu, San Diego, CA (US); Li Zhang, San Diego, CA (US); Kai Zhang, San Diego, CA (US); Hongbin Liu, Beijing (CN); Yue Wang, Beijing (CN)

(73) Assignees: BEIJING BYTEDANCE NETWORK TECHNOLOGY CO., LTD, Beijing (CN); BYTEDANCE INC., Los Angeles, CA (US)

( * ) Notice: Subject to any disclaimer, the term of this patent is extended or adjusted under 35 U.S.C. 154(b) by 113 days.

(21) Appl. No.: 17/652,184

(22) Filed: Feb. 23, 2022

(65) Prior Publication Data
US 2022/0264143 A1 Aug. 18, 2022

Related U.S. Application Data

(63) Continuation of application No. PCT/CN2020/110801, filed on Aug. 24, 2020.

(51) Int. Cl.
*H04N 19/00* (2014.01)
*H04N 19/105* (2014.01)
(Continued)

(52) U.S. Cl.
CPC ......... *H04N 19/132* (2014.11); *H04N 19/105* (2014.11); *H04N 19/176* (2014.11);
(Continued)

(58) Field of Classification Search
CPC .. H04N 19/132; H04N 19/105; H04N 19/176; H04N 19/1883; H04N 19/52; H04N 19/56; H04N 19/70
See application file for complete search history.

(56) References Cited

U.S. PATENT DOCUMENTS

| | | |
|---|---|---|
| 10,362,330 B1 | 7/2019 | Li et al. |
| 2011/0200107 A1 | 8/2011 | Ryu |

(Continued)

FOREIGN PATENT DOCUMENTS

| | | |
|---|---|---|
| CN | 103931188 A | 7/2014 |
| CN | 105900425 A | 8/2016 |

(Continued)

OTHER PUBLICATIONS

Bross et al. "Versatile Video Coding (Draft 6)". Jul. 2019. (Year: 2019).*

(Continued)

*Primary Examiner* — Zhihan Zhou
(74) *Attorney, Agent, or Firm* — Perkins Coie LLP

(57) ABSTRACT

A method of video processing is described. The method of video processing includes: constructing, for a conversion between a current video block of a current picture of a video and a coded representation of the video, a history-based motion vector predictor (HMVP) table according to a rule, and performing the conversion using the HMVP table, wherein the current video block is coded in the coded representation using a block vector that represents a displacement between the current video block and a region in the current picture used for predicting the current video block; wherein the rule specifies that the constructing uses block vector information of previously processed video blocks in the HMVP table.

19 Claims, 24 Drawing Sheets

(51) Int. Cl.
H04N 19/132 (2014.01)
H04N 19/169 (2014.01)
H04N 19/176 (2014.01)
H04N 19/52 (2014.01)
H04N 19/56 (2014.01)
H04N 19/70 (2014.01)

(52) U.S. Cl.
CPC ......... H04N 19/1883 (2014.11); H04N 19/52 (2014.11); H04N 19/56 (2014.11); H04N 19/70 (2014.11)

(56) References Cited

U.S. PATENT DOCUMENTS

| | | | |
|---|---|---|---|
| 2015/0271515 A1* | 9/2015 | Pang | H04N 19/70 375/240.16 |
| 2017/0099490 A1 | 4/2017 | Seregin et al. | |
| 2017/0155914 A1* | 6/2017 | Jeon | H04N 19/52 |
| 2019/0149838 A1 | 5/2019 | Zhang et al. | |
| 2020/0404287 A1* | 12/2020 | Xu | H04N 19/96 |
| 2021/0006787 A1 | 1/2021 | Zhang et al. | |
| 2021/0037240 A1 | 2/2021 | Zhang et al. | |
| 2021/0037256 A1 | 2/2021 | Zhang et al. | |
| 2021/0160532 A1 | 5/2021 | Zhang et al. | |
| 2021/0211654 A1 | 7/2021 | Zhang et al. | |
| 2021/0218980 A1 | 7/2021 | Zhang et al. | |
| 2021/0250580 A1* | 8/2021 | Chen | H04N 19/105 |
| 2021/0266577 A1 | 8/2021 | Zhang et al. | |
| 2021/0266584 A1 | 8/2021 | Zhang et al. | |
| 2021/0266591 A1 | 8/2021 | Zhang et al. | |
| 2021/0274167 A1 | 9/2021 | Liu et al. | |
| 2021/0281847 A1 | 9/2021 | Zhang et al. | |
| 2021/0297662 A1* | 9/2021 | Ko | H04N 19/51 |
| 2021/0314560 A1* | 10/2021 | Lai | H04N 19/159 |
| 2021/0352309 A1 | 11/2021 | Liu et al. | |
| 2021/0352315 A1 | 11/2021 | Zhang et al. | |
| 2021/0385451 A1 | 12/2021 | Zhang et al. | |
| 2022/0007047 A1 | 1/2022 | Zhang et al. | |
| 2022/0014734 A1 | 1/2022 | Liu et al. | |
| 2022/0014782 A1 | 1/2022 | Chon et al. | |

FOREIGN PATENT DOCUMENTS

| | | |
|---|---|---|
| CN | 106576172 A | 4/2017 |
| CN | 107018417 A | 8/2017 |
| CN | 107113424 A | 8/2017 |
| CN | 109905714 A | 6/2019 |
| CN | 109937570 A | 6/2019 |
| KR | 20160037110 A | 4/2016 |
| WO | 2013077659 A1 | 5/2013 |
| WO | 2015106121 A1 | 7/2015 |
| WO | 2016034058 A1 | 3/2016 |
| WO | 2016078599 A1 | 5/2016 |
| WO | 2019150350 A1 | 8/2019 |

OTHER PUBLICATIONS

Bross et al. "Versatile Video Coding (Draft 6)," Joint Video Experts Team (JVET) of ITU-T SG 16 WP 3 and ISO/IEC JTC 1/SC 29/WG 11 15th Meeting: Gothenburg, SE, Jul. 3-12, 2019. document JVET-O2001, 2019.

Chen et al. "CE4-related: Modified History-based MVP to Support Parallel Processing," Joint Video Experts Team (JVET) of ITU-T SG 16 WP 3 and ISO/IEC JTC 1/SC 29/WG 11 12th Meeting: Macao, CN, Oct. 3-12, 2018, document JVET-L0106, 2018.

Nam et al. "CE8-related: Modified Block Vector Coding for IBC," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0459, 2019.

Zhang et al. "CE4-related: History-based Motion Vector Prediction," Joint Video Experts Team (JVET) of ITU-T SG 16 WP 3 and ISO/IEC JTC 1/SC 29/WG 11 11th Meeting: Ljubljana, SI, Jul. 10-18, 2018, document JVET-K0104, 2018.

Zhang et al. "CE4: History-based Motion Vector Prediction (Test 4.4.7)," Joint Video Experts Team (JVET) of ITU-T SG 16 WP 3 and ISO/IEC JTC 1/SC 29/WG 11 12th Meeting: Macao, CN, Oct. 3-12, 2018, document JVET-L0266, 2018.

Zhang et al. "Non-CE8: Fixes of IBC BV Candidate List," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0574, 2019.

http://phenix.it-sudparis.eu/jvet/doc_end_user/documents/15_Gothenburg/wg11/JVET-O2001-v14.zip.

https://vcgit.hhi.fraunhofer.de/jvet/VVCSoftware_VTM/tags/VTM-6.0.

International Search Report and Written Opinion from International Patent Application No. PCT/CN2020/110801 dated Dec. 1, 2020 (12 pages).

International Search Report and Written Opinion from International Patent Application No. PCT/CN2020/110809 dated Nov. 30, 2020 (10 pages).

International Search Report and Written Opinion from International Patent Application No. PCT/CN2020/110820 dated Nov. 26, 2020 (11 pages).

The First Office Action from Chinese Patent Application No. 202080060048.5 dated May 30, 2024.

The First Office Action from Chinese Patent Application No. 202080060088.X dated May 31, 2024.

The First Office Action from Chinese Patent Application No. 202080060046.6 dated Jun. 28, 2024.

* cited by examiner

CODED REPRESENTATION OF HISTORY-BASED MOTION VECTOR PREDICTION TABLES

CROSS REFERENCE TO RELATED APPLICATIONS

This application is a continuation of International Application No. PCT/CN2020/110801, filed on Aug. 24, 2020, which claims the priority to and benefits of International Patent Application No. PCT/CN2019/102411, filed on Aug. 24, 2019. For all purposes under the law, the entire disclosures of the aforementioned applications are incorporated by reference as part of the disclosure of this application.

TECHNICAL FIELD

This patent document relates to video coding and decoding.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video processing, and specifically, to video and image coding and decoding that use block vector coding.

In one example aspect, a method of video processing is disclosed. The method includes constructing, for a conversion between a current video block of a current picture of a video and a coded representation of the video, a history-based motion vector predictor (HMVP) table according to a rule, and performing the conversion using the HMVP table, wherein the current video block is coded in the coded representation using a block vector that represents a displacement between the current video block and a region in the current picture used for predicting the current video block; wherein the rule specifies that the constructing uses block vector information of previously processed video blocks in the HMVP table.

In another example aspect, another method of video processing is disclosed. The method includes determining, for a conversion between a current video block of a current picture of a video and a coded representation of the video, a block vector predictor based on one or more entries in a history-based motion vector prediction (HMVP) table, the one or more entries corresponding to one or more block vector candidates from one or more previously processed blocks; and performing the conversion based on the determining, wherein the current video block is coded in the coded representation using a block vector that represents a displacement between the current video block and a region in the current picture used for predicting the current video block.

In another example aspect, another method of video processing is disclosed. The method includes determining, for a conversion between a current video block of a video and a coded representation of the video, to clip a motion vector or a block vector that is derived using a history-based motion vector prediction (HMVP) table including one or more entries corresponding to motion information of one or more previously processed blocks; and performing the conversion based on the determining.

In another example aspect, another method of video processing is disclosed. The method includes making a first determination, for a conversion between a current video block of a current picture of a video and a coded representation of the video, that a history-based motion vector predictor (HMVP) table for the current video block does not include any entries for predicting a block vector that represents a displacement between the current video block and a region in the current picture used for predicting the current video block; making a second determination, based on the first determination and a rule, regarding use of the block vector for the conversion of the current video block; and performing the conversion according to the first determination and the second determination.

In another example aspect, another method of video processing is disclosed. The method includes determining, for a conversion between a current video block of a current picture of a video and a coded representation of the video, a block motion vector predictor used for block vector prediction; generating a modified block motion vector predictor by modifying the block motion vector predictor; and performing the conversion using the modified block motion vector predictor, wherein the block vector prediction predicts a block vector that represents a displacement between the current video block and a region in the current picture used for predicting the current video block.

In another example aspect, another method of video processing is disclosed. The method includes determining, for a conversion between a current video block of a current picture of a video and a coded representation of the current video block, a block motion vector predictor for predicting a block vector based on a history-based motion vector prediction (HMVP) table including motion vector information of previously processed video blocks; and performing the conversion using the block motion vector predictor, wherein the current video block is coded in the coded representation using the block vector that represents a displacement between the current video block and a region in the current picture used for predicting the current video block.

In another example aspect, another method of video processing is disclosed. The method includes performing a conversion between a video comprising video blocks and a coded representation of the video; wherein the coded representation conforms to a format rule, wherein the format rule specifies that context adaptive coding of a block vector predictor (BVP) index of a first video block coded using a block vector (BV) prediction mode and an index for inter mode coding used for coding a second video block is performed by sharing a same context; wherein the BVP index is to an entry in a history-based motion vector predictor list used for generating a block vector predictor for the first video block.

In another example aspect, another method of video processing is disclosed. The method includes performing a conversion between a video comprising video blocks and a coded representation of the video; wherein the coded representation conforms to a format rule, wherein the format rule specifies that context adaptive coding of a block vector predictor (BVP) index of a first video block coded using a block vector (BV) prediction mode is performed independently of a context used for coding an index for inter mode coding used in a second video block; wherein the BVP index is to an entry in a history-based motion vector predictor list used for generating a block vector predictor for the first video block.

In another example aspect, another method of video processing is disclosed. The method includes performing a conversion between a current video block of a current picture of a video and a coded representation of the video, wherein the current video block is coded in the coded representation using a block vector that represents a displacement between the current video block and a region in the current picture used for predicting the current video block, wherein the conversion is performed using a history-based motion vector prediction (HMVP) table that includes one or more previously used block vectors; wherein the coded representation includes a syntax element representing an index of an entry in the HMVP table that is applied to the current video block, wherein a maximum value of binarization of the index is determined according to a rule.

In another example aspect, another method of video processing is disclosed. The method includes resetting, for a conversion between a current video region of a video and a coded representation of the video, a history-based motion vector prediction (HMVP) table that includes one or more previously used block vectors, wherein the resetting includes setting an indication of available entries of the HMVP table to K, where K is an integer that is unequal to zero; and performing the conversion using the HMVP table.

In another example aspect, another method of video processing is disclosed. The method includes: initializing, for a conversion between a current video block of a video and a coded representation of the video, a table that includes motion vector information of previously processed video blocks using multiple constant block vectors to the table; and performing the conversion using the table.

In another example aspect, another method of video processing is disclosed. The method includes: performing a conversion between a current video block of a current picture of a video and a coded representation of the video according to a rule, wherein the current video block is coded in the coded representation using a block vector that represents a displacement between the current video block and a region in the current picture used for predicting the current video block; wherein a syntax element is included in the coded representation indicating an index to a history-based motion vector predictor (HMVP) list used for the conversion, and wherein the rule specifies that, in case that the index indicated by the syntax element is no smaller than a number of entries in the HMVP list, a default process is used for determining a prediction of the block vector.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

DETAILED DESCRIPTION

Figure 2:
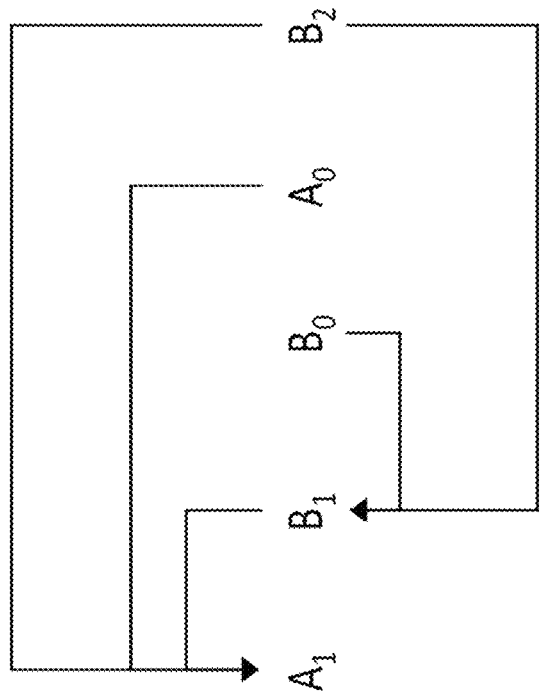
FIG. 2 shows example candidate pairs considered for redundancy check of spatial merge candidates.

Embodiments of the disclosed technology may be applied to existing video coding standards (e.g., HEVC, H.265) and future standards to improve compression performance. Section headings are used in the present document to improve readability of the description and do not in any way limit the discussion or the embodiments (and/or implementations) to the respective sections only.

1 Summary

This document is related to video coding technologies. Specifically, it is related to motion/block vector coding in video coding. It may be applied to the existing video coding standard like HEVC, or the standard to be finalized, e.g. Versatile Video Coding and Audio Video Coding Standard version 3. It may be also applicable to future video coding standards or video codec.

2 Initial Discussion

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM) [3][4]. In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

2.1 Inter Prediction

For each inter-predicted CU, motion parameters consisting of motion vectors, reference picture indices and reference picture list usage index, and additional information needed for the new coding feature of VVC to be used for inter-predicted sample generation. The motion parameter can be signalled in an explicit or implicit manner. When a CU is coded with skip mode, the CU is associated with one PU and has no significant residual coefficients, no coded motion vector delta or reference picture index. A merge mode is specified whereby the motion parameters for the current CU are obtained from neighbouring CUs, including spatial and temporal candidates, and additional schedules introduced in VVC. The merge mode can be applied to any inter-predicted CU, not only for skip mode. The alternative to merge mode is the explicit transmission of motion parameters, where motion vector, corresponding reference picture index for each reference picture list and reference picture list usage flag and other needed information are signalled explicitly per each CU.

Beyond the inter coding features in HEVC, the VTM5 includes a number of new and refined inter prediction coding tools listed as follows:

Extended merge prediction
Merge mode with MVD (MMVD)
AMVP mode with symmetric MVD signalling
Affine motion compensated prediction
Subblock-based temporal motion vector prediction (SbTMVP)
Adaptive motion vector resolution (AMVR)
Motion field storage: $1/16^{th}$ luma sample MV storage and 8×8 motion field compression
Bi-prediction with CU-level weight (BCVV)
Bi-directional optical flow (BDOF)
Decoder side motion vector refinement (DMVR)
Triangle partition prediction
Combined inter and intra prediction (CIIP)

The following text provides the details on the inter prediction methods specified in VVC.

2.1.1 Extended Merge Prediction

In VTM5, the merge candidate list is constructed by including the following five types of candidates in order:
1) Spatial MVP from spatial neighbour CUs
2) Temporal MVP from collocated CUs
3) History-based MVP from an FIFO table
4) Pairwise average MVP
5) Zero MVs.

The size of merge list is signalled in slice header and the maximum allowed size of merge list is 6 in VTM5. For each CU code in merge mode, an index of best merge candidate is encoded using truncated unary binarization (TU). The first bin of the merge index is coded with context and bypass coding is used for other bins.

The generation process of each category of merge candidates is provided in this session.

2.1.1.1 Spatial Candidates' Derivation

The derivation of spatial merge candidates in VVC is same to that in HEVC. A maximum of four merge candidates are selected among candidates located in the positions depicted in FIG. 1. The order of derivation is $A_0$, $B_0$, $B_1$, $A_1$ and $B_2$. Position $B_2$ is considered only when any CU of position $A_0$, $B_0$, $B_1$, $A_1$ is not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 2 are considered and a candidate is only added to the list if the corresponding candidate used for redundancy check has not the same motion information.

Figure 1:
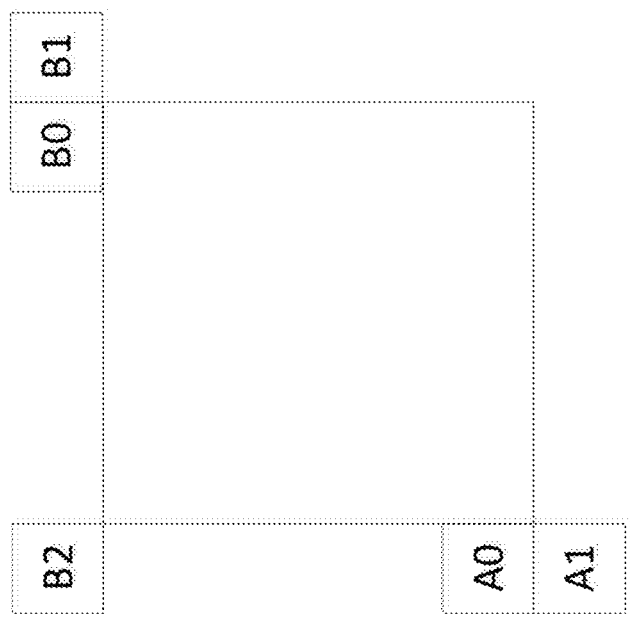
FIG. 1 shows example positions of spatial merge candidate.

FIG. 1 shows example positions of spatial merge candidate.

FIG. 2 shows example candidate pairs considered for redundancy check of spatial merge candidates.

2.1.1.2 Temporal Candidates Derivation

In this step, only one candidate is added to the list. Particularly, in the derivation of this temporal merge candidate, a scaled motion vector is derived based on co-located CU belonging to the collocated reference picture. The reference picture list to be used for derivation of the co-located CU is explicitly signalled in the slice header. The scaled motion vector for temporal merge candidate is obtained as illustrated by the dotted line in FIG. 3, which is scaled from the motion vector of the co-located CU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero.

Figure 3:
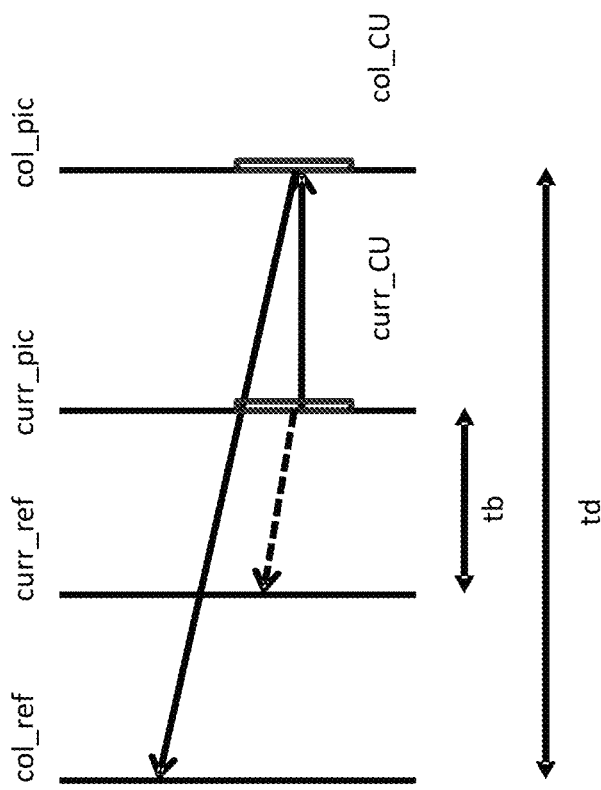
FIG. 3 is an illustration of motion vector scaling for temporal merge candidate.

FIG. 3 is an illustration of motion vector scaling for temporal merge candidate.

Figure 4:
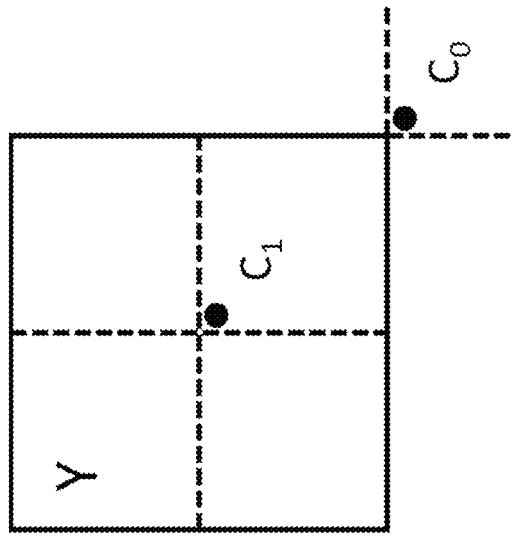
FIG. 4 shows examples of candidate positions for temporal merge candidate, $C_0$ and $C_1$.

The position for the temporal candidate is selected between candidates $C_0$ and $C_1$, as depicted in FIG. 4. If CU at position $C_0$ is not available, is intra coded, or is outside of the current row of CTUs, position $C_1$ is used. Otherwise, position $C_0$ is used in the derivation of the temporal merge candidate.

FIG. 4 shows examples of candidate positions for temporal merge candidate, $C_0$ and $C_1$.

History-Based Merge Candidates Derivation

The history-based MVP (HMVP) merge candidates are added to merge list after the spatial MVP and TMVP. In this method, the motion information of a previously coded block is stored in a table and used as MVP for the current CU. The table with multiple HMVP candidates is maintained during the encoding/decoding process. The table is reset (emptied) when a new CTU row is encountered. Whenever there is a non-subblock inter-coded CU, the associated motion information is added to the last entry of the table as a new HMVP candidate.

In VTM5 the HMVP table size S is set to be 6, which indicates up to 6 History-based MVP (HMVP) candidates may be added to the table. When inserting a new motion candidate to the table, a constrained first-in-first-out (FIFO) rule is utilized wherein redundancy check is firstly applied to find whether there is an identical HMVP in the table. If found, the identical HMVP is removed from the table and all the HMVP candidates afterwards are moved forward, HMVP candidates could be used in the merge candidate list construction process. The latest several HMVP candidates in the table are checked in order and inserted to the candidate list after the TMVP candidate. Redundancy check is applied on the HMVP candidates to the spatial or temporal merge candidate.

To reduce the number of redundancy check operations, the following simplifications are introduced:
1) Number of HMPV candidates is used for merge list generation is set as (N<=4)?M: (8−N), wherein N indicates number of existing candidates in the merge list and M indicates number of available HMVP candidates in the table.
2) Once the total number of available merge candidates reaches the maximally allowed merge candidates minus 1, the merge candidate list construction process from HMVP is terminated.

2.1.1.3 Pair-Wise Average Merge Candidates Derivation

Pairwise average candidates are generated by averaging predefined pairs of candidates in the existing merge candidate list, and the predefined pairs are defined as {(0, 1), (0, 2), (1, 2), (0, 3), (1, 3), (2, 3)}, where the numbers denote the merge indices to the merge candidate list. The averaged motion vectors are calculated separately for each reference list. If both motion vectors are available in one list, these two motion vectors are averaged even when they point to different reference pictures; if only one motion vector is available, use the one directly; if no motion vector is available, keep this list invalid.

When the merge list is not full after pair-wise average merge candidates are added, the zero MVPs are inserted in the end until the maximum merge candidate number is encountered.

2.1.2 Merge Mode with MVD (MMVD)

In addition to merge mode, where the implicitly derived motion information is directly used for prediction samples generation of the current CU, the merge mode with motion vector differences (MMVD) is introduced in VVC. A MMVD flag is singnaled right after sending a skip flag and merge flag to specify whether MMVD mode is used for a CU.

In MMVD, after a merge candidate is selected, it is further refined by the signalled MVDs information. The further information includes a merge candidate flag, an index to specify motion magnitude, and an index for indication of motion direction. In MMVD mode, one for the first two candidates in the merge list is selected to be used as MV basis. The merge candidate flag is signalled to specify which one is used.

Figure 5:
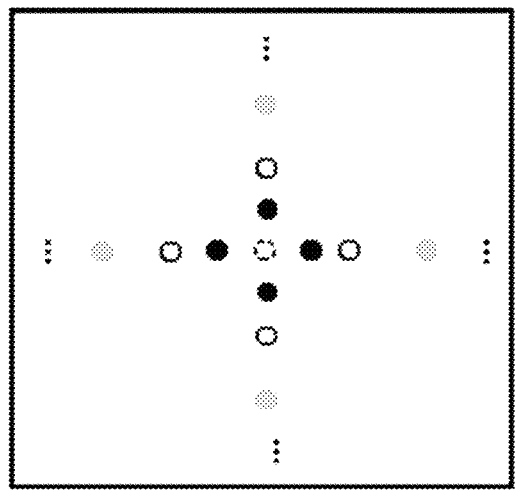
FIG. 5 shows examples of MMVD Search Points.
Figure 5:
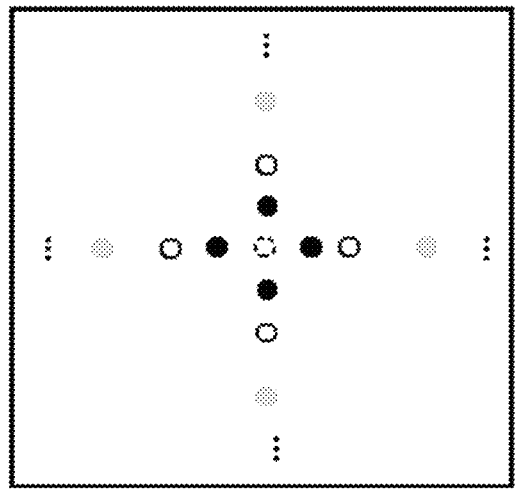

FIG. 5 shows examples of MMVD Search Points.

Distance index specifies motion magnitude information and indicate the pre-defined offset from the starting point. As shown in FIG. 5, an offset is added to either horizontal component or vertical component of starting MV. The relation of distance index and pre-defined offset is specified in Table 1.

TABLE 1

The relation of distance index and pre-defined offset

| Distance IDX | 0 | 1 | 2 | 3 | 4 | 5 | 6 | 7 |
|---|---|---|---|---|---|---|---|---|
| Offset (in unit of luma sample) | 1/4 | 1/2 | 1 | 2 | 4 | 8 | 16 | 32 |

Direction index represents the direction of the MVD relative to the starting point. The direction index can represent of the four directions as shown in Table. It's noted that the meaning of MVD sign could be variant according to the information of starting MVs. When the starting MVs is an un-prediction MV or bi-prediction MVs with both lists point to the same side of the current picture (i.e. POCs of two references are both larger than the POC of the current picture, or are both smaller than the POC of the current picture), the sign in Table specifies the sign of MV offset added to the starting MV. When the starting MVs is bi-prediction MVs with the two MVs point to the different sides of the current picture (i.e. the POC of one reference is larger than the POC of the current picture, and the POC of the other reference is smaller than the POC of the current picture), the sign in Table specifies the sign of MV offset added to the list0 MV component of starting MV and the sign for the list1 MV has opposite value.

TABLE 2

Sign of MV offset specified by direction index

| Direction IDX | 00 | 01 | 10 | 11 |
|---|---|---|---|---|
| x-axis | + | − | N/A | N/A |
| y-axis | N/A | N/A | + | − |

2.1.3 Symmetric MVD Coding

In VTM5, besides the normal unidirectional prediction and bi-directional prediction mode MVD signalling, symmetric MVD mode for bi-predictional MVD signalling is applied. In the symmetric MVD mode, motion information including reference picture indices of both list-0 and list-1 and MVD of list-1 are not signaled but derived.

The decoding process of the symmetric MVD mode is as follows:
1. At slice level, variables BiDirPredFlag, RefIdxSymL0 and RefIdxSymL1 are derived as follows:
   If mvd_l1_zero_flag is 1, BiDirPredFlag is set equal to 0.
   Otherwise, if the nearest reference picture in list-0 and the nearest reference picture in list-1 form a forward and backward pair of reference pictures or a backward and forward pair of reference pictures, BiDirPredFlag is set to 1. Otherwise BiDirPredFlag is set to 0.
2. At CU level, a symmetrical mode flag indicating whether symmetrical mode is used or not is explicitly signaled if the CU is bi-prediction coded and BiDirPredFlag is equal to 1.

When the symmetrical mode flag is true, only mvp_l0_flag, mvp_l1_flag and MVD0 are explicitly signaled. The reference indices for list-0 and list-1 are set equal to the pair of reference pictures, respectively. MVD1 is set equal to (−MVD0). The final motion vectors are shown in below formula.

$$\begin{cases} (mvx_0, mvy_0) = (mvpx_0 + mvdx_0, mvpy_0 + mvdy_0) \\ (mvx_1, mvy_1) = (mvpx_1 - mvdx_0, mvpy_1 - mvdy_0) \end{cases} \quad (3\text{-}1)$$

Figure 6:
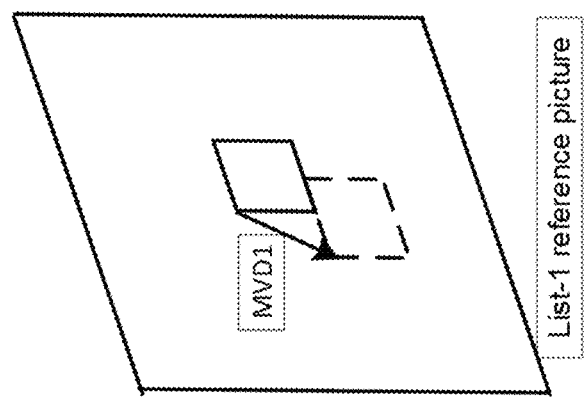
FIG. 6 is an example illustration for symmetrical MVD mode.
Figure 6:
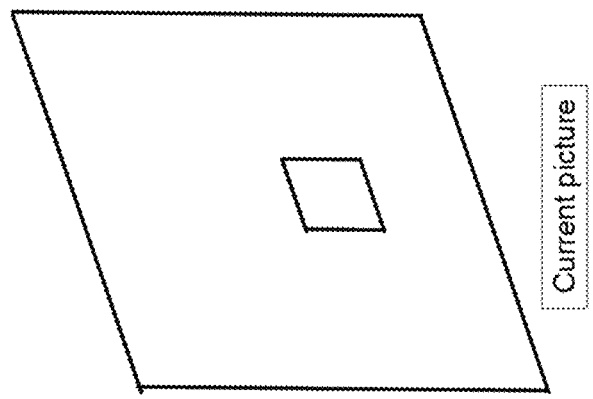
Figure 6:
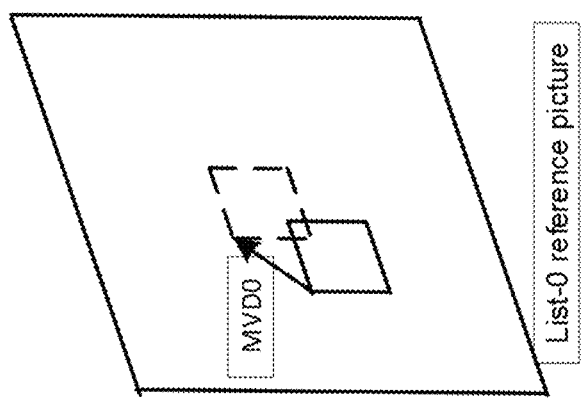

FIG. 6 is an example illustration for symmetrical MVD mode.

In the encoder, symmetric MVD motion estimation starts with initial MV evaluation. A set of initial MV candidates comprising of the MV obtained from uni-prediction search, the MV obtained from bi-prediction search and the MVs from the AMVP list. The one with the lowest rate-distortion cost is chosen to be the initial MV for the symmetric MVD motion search.

2.1.4 Affine Motion Compensated Prediction

Figure 7A:
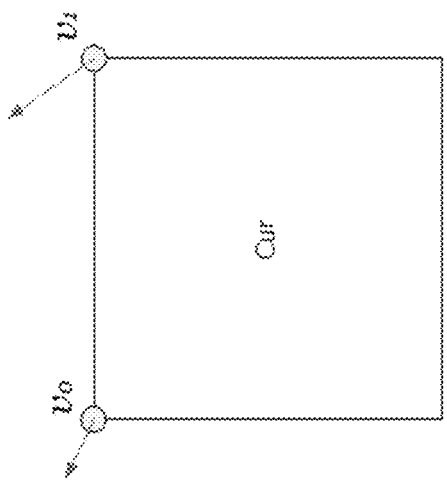
FIGS. 7A and 7B show examples of control point based affine motion model.
Figure 7B:
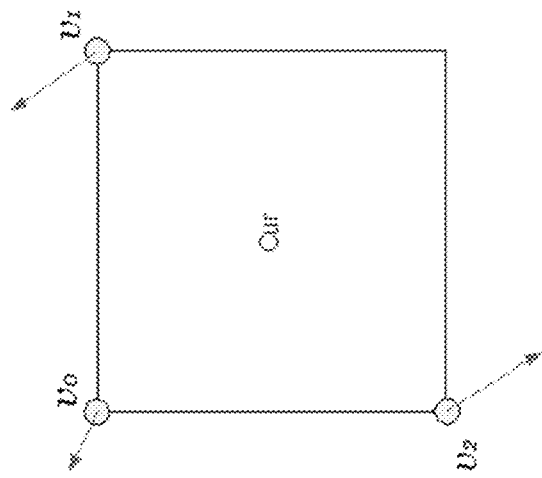

In HEVC, only translation motion model is applied for motion compensation prediction (MCP). While in the real world, there are many kinds of motion, e.g. zoom in/out, rotation, perspective motions and the other irregular motions. In the VTM5, a block-based affine transform motion compensation prediction is applied. As shown in FIG. 7A-7B, the affine motion field of the block is described by motion information of two control point (4-parameter) or three control point motion vectors (6-parameter).

FIGS. 7A-7B show control point based affine motion model for 4 parameter affine model (FIG. 7A) and 6 parameter affine model (FIG. 7B).

For 4-parameter affine motion model, motion vector at sample location (x, y) in a block is derived as:

$$\begin{cases} mv_x = \dfrac{mv_{1x} - mv_{0x}}{W}x + \dfrac{mv_{1y} - mv_{0y}}{W}y + mv_{0x} \\ mv_y = \dfrac{mv_{1y} - mv_{0y}}{W}x + \dfrac{mv_{1y} - mv_{0x}}{W}y + mv_{0y} \end{cases} \quad (3\text{-}2)$$

For 6-parameter affine motion model, motion vector at sample location (x, y) in a block is derived as:

$$\begin{cases} mv_x = \dfrac{mv_{1x} - mv_{0x}}{W}x + \dfrac{mv_{2x} - mv_{0x}}{H}y + mv_{0x} \\ mv_y = \dfrac{mv_{1y} - mv_{0y}}{W}x + \dfrac{mv_{2y} - mv_{0y}}{H}y + mv_{0y} \end{cases} \quad (3\text{-}3)$$

Where $(mv_{0x}, mv_{0y})$ is motion vector of the top-left corner control point, $(mv_{1x}, mv_{1y})$ is motion vector of the top-right corner control point, and $(mv_{2x}, mv_{2y})$ is motion vector of the bottom-left corner control point.

Figure 8:
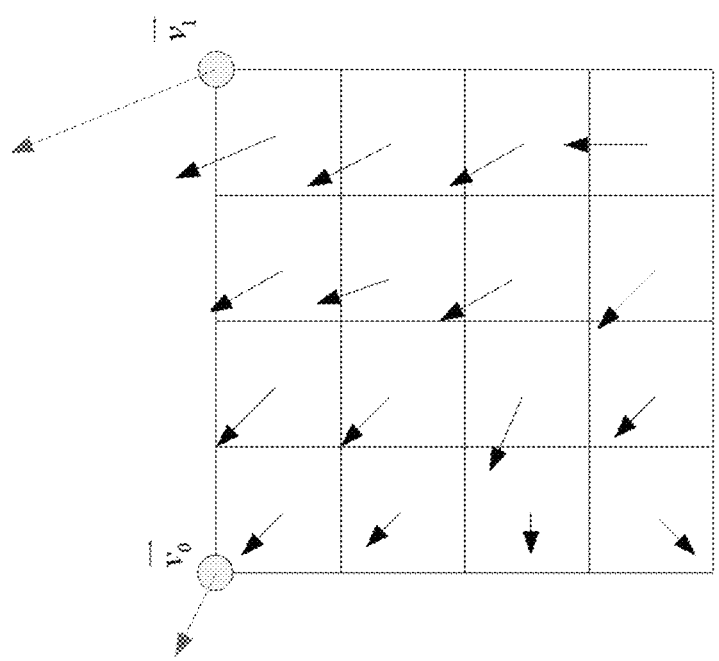
FIG. 8 shows an example of affine MVF per sub-block.

In order to simplify the motion compensation prediction, block based affine transform prediction is applied. To derive motion vector of each 4×4 luma sub-block, the motion vector of the center sample of each sub-block, as shown in FIG. 8, is calculated according to above equations, and rounded to 1/16 fraction accuracy. Then the motion compensation interpolation filters are applied to generate the prediction of each sub-block with derived motion vector. The sub-block size of chroma-components is also set to be 4×4. The MV of a 4×4 chroma sub-block is calculated as the average of the MVs of the four corresponding 4×4 luma sub-blocks.

FIG. 8 shows an example of affine MVF per sub-block.

As done for translational motion inter prediction, there are also two affine motion inter prediction modes: affine merge mode and affine AMVP mode.

2.1.4.1 Affine Merge Prediction

Figure 9:
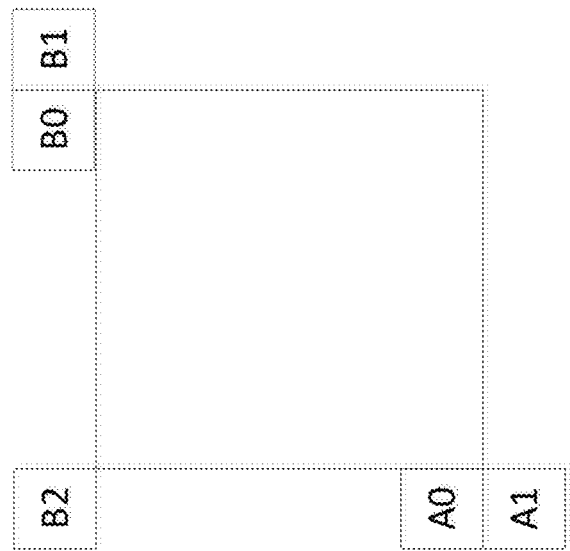
FIG. 9 shows locations of inherited affine motion predictors.

AF_MERGE mode can be applied for CUs with both width and height larger than or equal to 8. In this mode the CPMVs of the current CU is generated based on the motion information of the spatial neighboring CUs. There can be up to five CPMVP candidates and an index is signalled to indicate the one to be used for the current CU. The following three types of CPVM candidate are used to form the affine merge candidate list:

1) Inherited affine merge candidates that extrapolated from the CPMVs of the neighbour CUs
2) Constructed affine merge candidates CPMVPs that are derived using the translational MVs of the neighbour CUs
3) Zero MVs In VTM5, there are maximum two inherited affine candidates, which are derived from affine motion model of the neighboring blocks, one from left neighboring CUs and one from above neighboring CUs. The candidate blocks are shown in FIG. 9 For the left predictor, the scan order is A0→A1, and for the above predictor, the scan order is B0→B1→B2. Only the first inherited candidate from each side is selected. No pruning check is performed between two inherited candidates. When a neighboring affine CU is identified, its control point motion vectors are used to derived the CPMVP candidate in the affine merge list of the current CU. As shown in, if the neighbour left bottom block A is coded in affine mode, the motion vectors $v_2$, $v_3$ and $v_4$ of the top left corner, above right corner and left bottom corner of the CU which contains the block A are attained. When block A is coded with 4-parameter affine model, the two CPMVs of the current CU are calculated according to $v_2$, and $v_3$. In case that block A is coded with 6-parameter affine model, the three CPMVs of the current CU are calculated according to $v_2$, $v_3$ and $v_4$.

FIG. 9 shows locations of inherited affine motion predictors.

Figure 10:
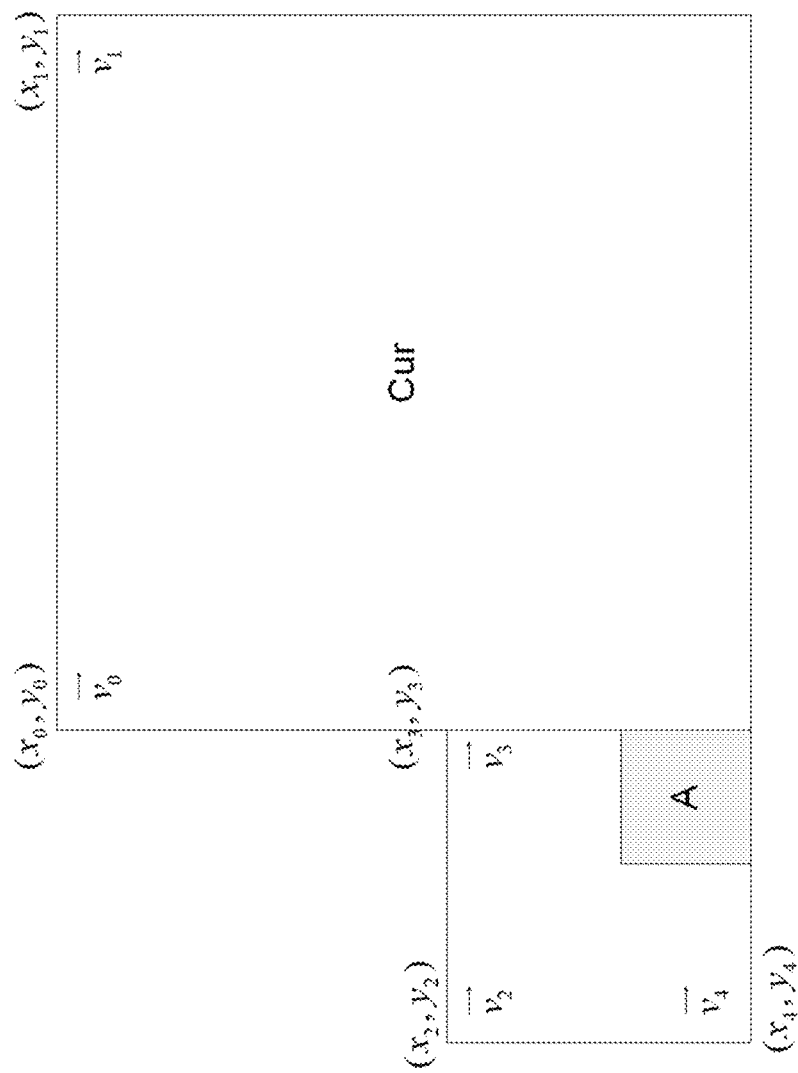
FIG. 10 shows an example of control point motion vector inheritance.

FIG. 10 shows an example of control point motion vector inheritance.

Constructed affine candidate means the candidate is constructed by combining the neighbor translational motion information of each control point. The motion information for the control points is derived from the specified spatial neighbors and temporal neighbor shown in FIG. 11. $CPMV_k$ (k=1, 2, 3, 4) represents the k-th control point. For $CPMV_1$, the B2→B3→A2 blocks are checked and the MV of the first available block is used. For $CPMV_2$, the B1→B0 blocks are checked and for $CPMV_3$, the A1→A0 blocks are checked. For TMVP is used as $CPMV_4$ if it's available.

After MVs of four control points are attained, affine merge candidates are constructed based on those motion information. The following combinations of control point MVs are used to construct in order:
{$CPMV_1$, $CPMV_2$, $CPMV_3$}, {$CPMV_1$, $CPMV_2$, $CPMV_4$}, {$CPMV_1$, $CPMV_3$, $CPMV_4$}, {$CPMV_2$, $CPMV_3$, $CPMV_4$}, {$CPMV_1$, $CPMV_2$}, {$CPMV_1$, $CPMV_3$}

The combination of 3 CPMVs constructs a 6-parameter affine merge candidate and the combination of 2 CPMVs constructs a 4-parameter affine merge candidate. To avoid motion scaling process, if the reference indices of control points are different, the related combination of control point MVs is discarded.

Figure 11:
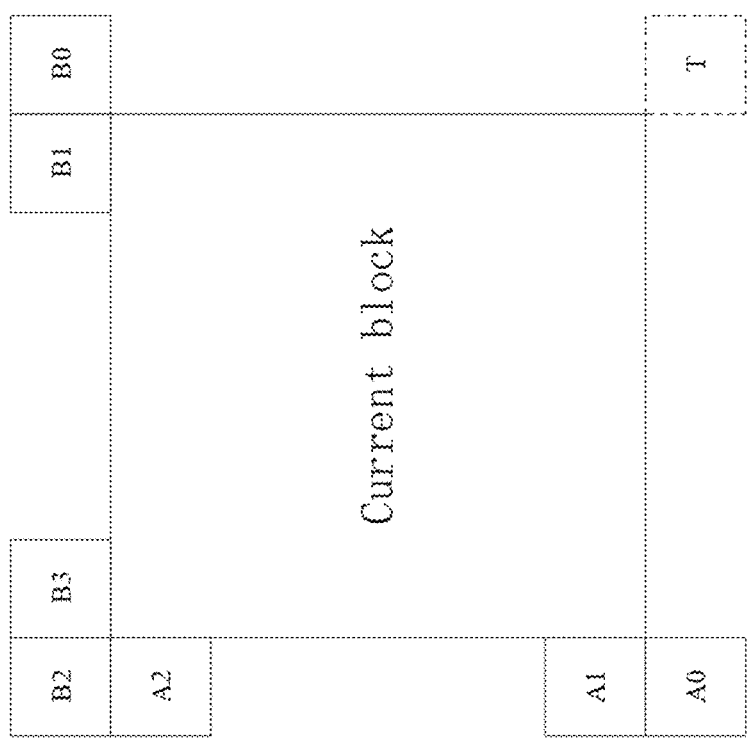
FIG. 11 shows examples of locations of Candidates position for constructed affine merge mode.

FIG. 11 shows examples of locations of candidates position for constructed affine merge mode.

After inherited affine merge candidates and constructed affine merge candidate are checked, if the list is still not full, zero MVs are inserted to the end of the list.

2.1.4.2 Affine AMVP Prediction

Affine AMVP mode can be applied for CUs with both width and height larger than or equal to 16. An affine flag in CU level is signalled in the bitstream to indicate whether affine AMVP mode is used and then another flag is signalled to indicate whether 4-parameter affine or 6-parameter affine. In this mode, the difference of the CPMVs of current CU and their predictors CPMVPs is signalled in the bitstream. The affine AVMP candidate list size is 2 and it is generated by using the following four types of CPVM candidate in order:/
1) Inherited affine AMVP candidates that extrapolated from the CPMVs of the neighbour CUs
2) Constructed affine AMVP candidates CPMVPs that are derived using the translational MVs of the neighbour CUs
3) Translational MVs from neighboring CUs
4) Zero MVs The checking order of inherited affine AMVP candidates is same to the checking order of inherited affine merge candidates. The only difference is that, for AVMP candidate, only the affine CU that has the same reference picture as in current block is considered. No pruning process is applied when inserting an inherited affine motion predictor into the candidate list.

Constructed AMVP candidate is derived from the specified spatial neighbors shown in FIG. 11. The same checking order is used as done in affine merge candidate construction. In addition, reference picture index of the neighboring block is also checked. The first block in the checking order that is inter coded and has the same reference picture as in current CUs is used. There is only one When the current CU is coded with 4-parameter affine mode, and $mv_0$ and $mv_1$ are both available, they are added as one candidate in the affine AMVP list. When the current CU is coded with 6-parameter affine mode, and all three CPMVs are available, they are added as one candidate in the affine AMVP list. Otherwise, constructed AMVP candidate is set as unavailable.

If affine AMVP list candidates is still less than 2 after inherited affine AMVP candidates and Constructed AMVP candidate are checked, $mv_0$, $mv_1$, and $mv_2$ will be added, in order, as the translational MVs to predict all control point MVs of the current CU, when available. Finally, zero MVs are used to fill the affine AMVP list if it is still not full.

2.1.4.3 Affine Motion Information Storage

In VTM5, the CPMVs of affine CUs are stored in a separate buffer. The stored CPMVs are only used to generate the inherited CPMVPs in affine merge mode and affine AMVP mode for the lately coded CUs. The sub-block MVs derived from CPMVs are used for motion compensation, MV derivation of merge/AMVP list of translational MVs and de-blocking.

Figure 12:
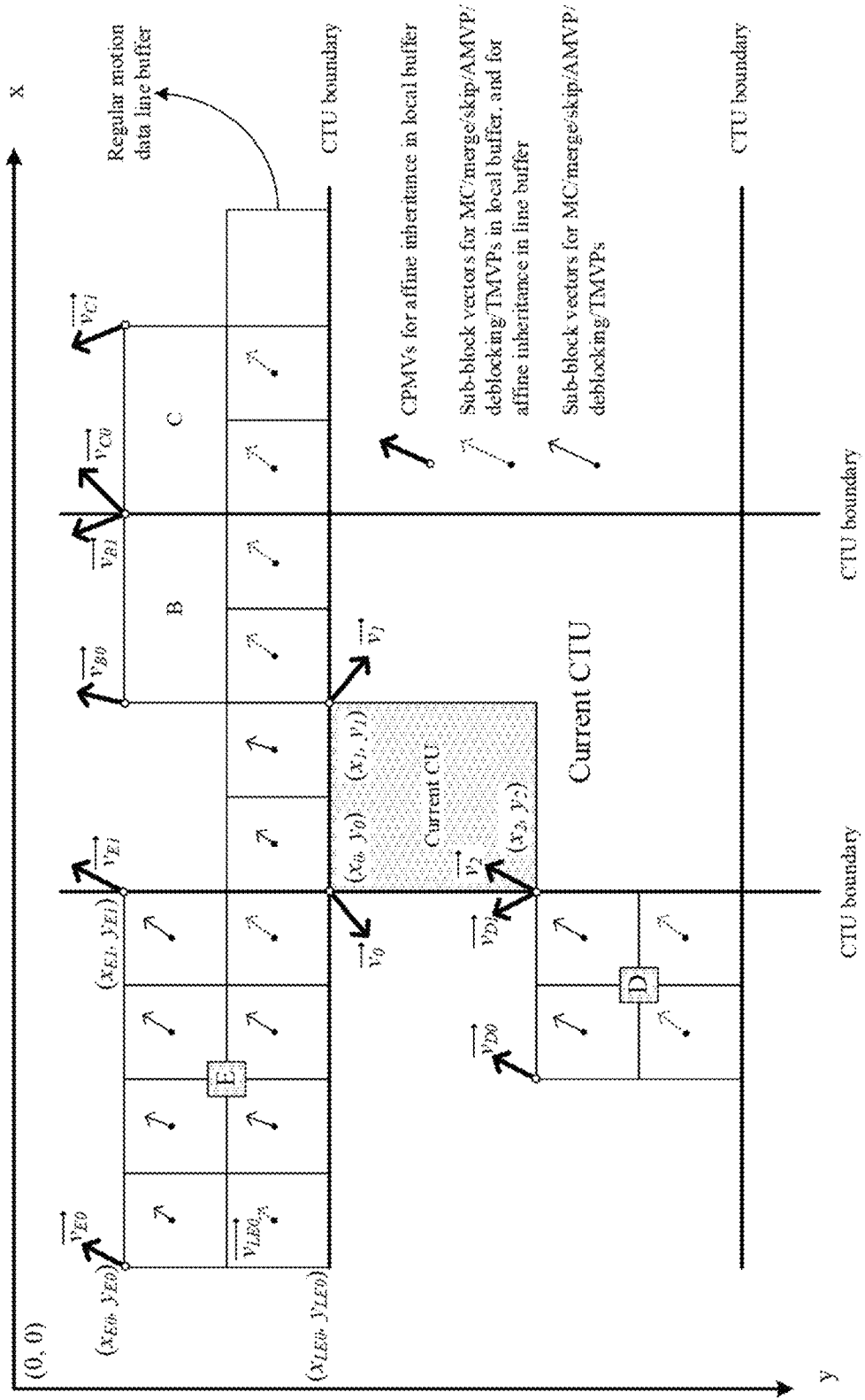
FIG. 12 is an illustration of motion vector usage for proposed combined method.

To avoid the picture line buffer for the additional CPMVs, affine motion data inheritance from the CUs from above CTU is treated differently to the inheritance from the normal neighboring CUs. If the candidate CU for affine motion data inheritance is in the above CTU line, the bottom-left and bottom-right sub-block MVs in the line buffer instead of the CPMVs are used for the affine MVP derivation. In this way, the CPMVs are only stored in local buffer. If the candidate CU is 6-parameter affine coded, the affine model is degraded to 4-parameter model. As shown in FIG. 12, along the top CTU boundary, the bottom-left and bottom right sub-block motion vectors of a CU are used for affine inheritance of the CUs in bottom CTUs.

FIG. 12 is an illustration of motion vector usage for proposed combined method.

2.1.5 Subblock-Based Temporal Motion Vector Prediction (SbTMVP)

VTM supports the subblock-based temporal motion vector prediction (SbTMVP) method. Similar to the temporal motion vector prediction (TMVP) in HEVC, SbTMVP uses the motion field in the collocated picture to improve motion vector prediction and merge mode for CUs in the current picture. The same collocated picture used by TMVP is used for SbTVMP. SbTMVP differs from TMVP in the following two main aspects:
1. TMVP predicts motion at CU level but SbTMVP predicts motion at sub-CU level;
2. Whereas TMVP fetches the temporal motion vectors from the collocated block in the collocated picture (the collocated block is the bottom-right or center block relative to the current CU), SbTMVP applies a motion shift before fetching the temporal motion information from the collocated picture, where the motion shift is obtained from the motion vector from one of the spatial neighboring blocks of the current CU.

Figure 13A:
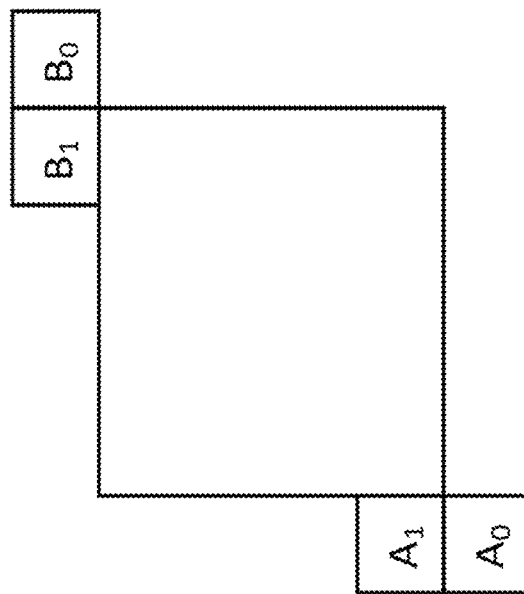
FIGS. 13A and 13B show examples of the SbTMVP process in VVC.
Figure 13B:
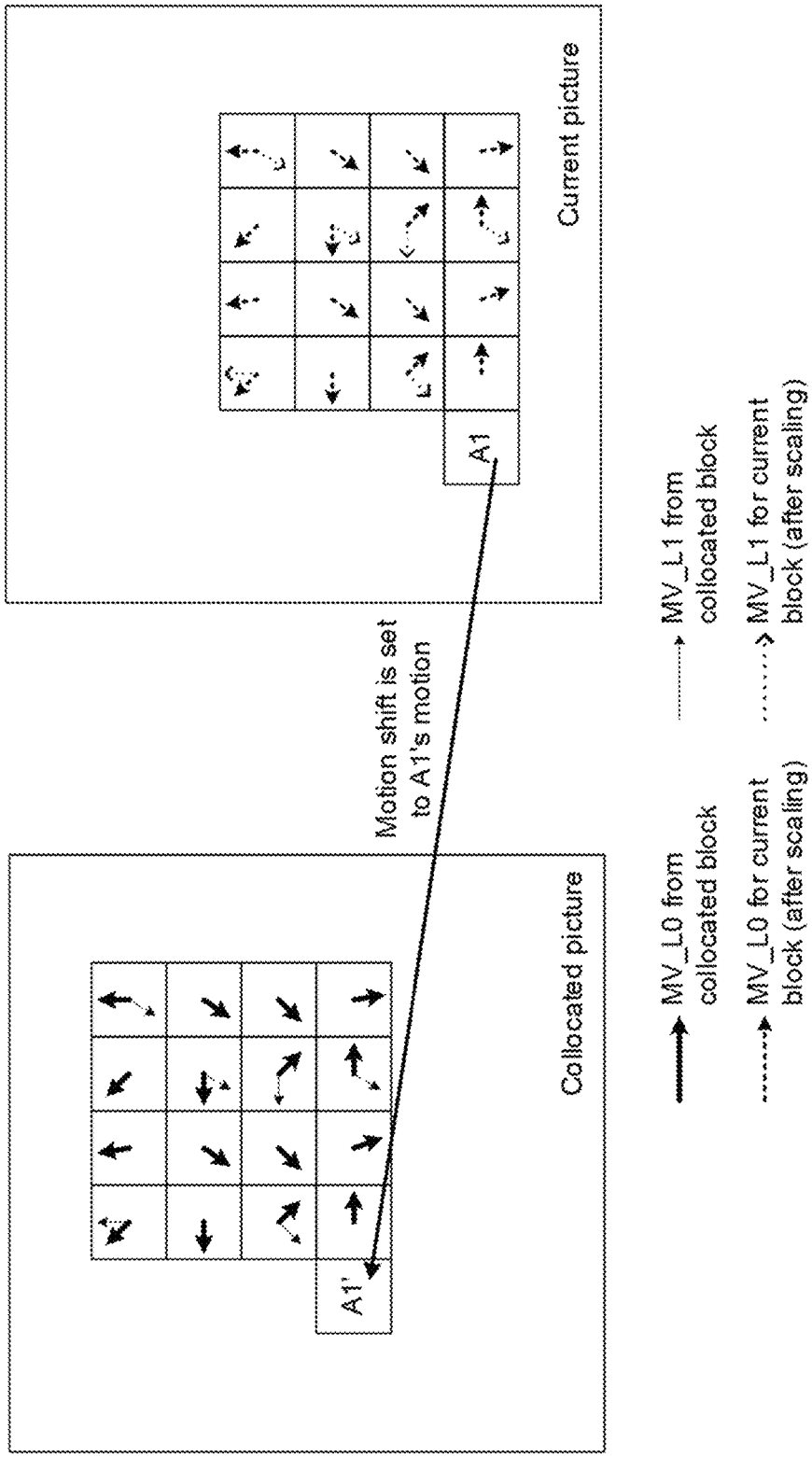

The SbTVMP process is illustrated in FIGS. 13A and 13B. SbTMVP predicts the motion vectors of the sub-CUs within the current CU in two steps. In the first step, the spatial neighbor A1 in FIG. 13A-13B is examined. If A1 has a motion vector that uses the collocated picture as its reference picture, this motion vector is selected to be the motion shift to be applied. If no such motion is identified, then the motion shift is set to (0, 0).

In the second step, the motion shift identified in Step 1 is applied (i.e. added to the current block's coordinates) to obtain sub-CU-level motion information (motion vectors and reference indices) from the collocated picture as shown in FIG. 13B. The example in FIG. 13B assumes the motion shift is set to block A1's motion. Then, for each sub-CU, the motion information of its corresponding block (the smallest motion grid that covers the center sample) in the collocated picture is used to derive the motion information for the sub-CU. After the motion information of the collocated sub-CU is identified, it is converted to the motion vectors and reference indices of the current sub-CU in a similar way as the TMVP process of HEVC, where temporal motion scaling is applied to align the reference pictures of the temporal motion vectors to those of the current CU.

Deriving sub-CU motion field by applying a motion shift from spatial neighbor and scaling the motion information from the corresponding collocated sub-CUs FIGS. 13A and 13B show examples of the SbTMVP process in VVC.

In VTM5, a combined sub-block based merge list which contains both SbTVMP candidate and affine merge candidates is used for the signalling of sub-block based merge mode. The SbTVMP mode is enabled/disabled by a sequence parameter set (SPS) flag. If the SbTMVP mode is enabled, the SbTMVP predictor is added as the first entry of the list of sub-block based merge candidates, and followed by the affine merge candidates. The size of sub-block based merge list is signalled in SPS and the maximum allowed size of the sub-block based merge list is 5 in VTM5.

The sub-CU size used in SbTMVP is fixed to be 8×8, and as done for affine merge mode, SbTMVP mode is only applicable to the CU with both width and height are larger than or equal to 8.

The encoding logic of the additional SbTMVP merge candidate is the same as for the other merge candidates, that is, for each CU in P or B slice, an additional RD check is performed to decide whether to use the SbTMVP candidate.

2.1.6 Adaptive Motion Vector Resolution (AMVR)

In HEVC, motion vector differences (MVDs) (between the motion vector and predicted motion vector of a CU) are signalled in units of quarter-luma-sample when use_integer_mv_flag is equal to 0 in the slice header. In VVC, a CU-level adaptive motion vector resolution (AMVR) scheme is introduced. AMVR allows MVD of the CU to be coded in different precision. Dependent on the mode (normal AMVP mode or affine AVMP mode) for the current CU, the MVDs of the current CU can be adaptively selected as follows:

Normal AMVP mode: quarter-luma-sample, integer-luma-sample or four-luma-sample.

Affine AMVP mode: quarter-luma-sample, integer-luma-sample or 1/16 luma-sample.

The CU-level MVD resolution indication is conditionally signalled if the current CU has at least one non-zero MVD component. If all MVD components (that is, both horizontal and vertical MVDs for reference list L0 and reference list L1) are zero, quarter-luma-sample MVD resolution is inferred.

For a CU that has at least one non-zero MVD component, a first flag is signalled to indicate whether quarter-luma-sample MVD precision is used for the CU. If the first flag is 0, no further signaling is needed and quarter-luma-sample MVD precision is used for the current CU. Otherwise, a second flag is signalled to indicate whether integer-luma-sample or four-luma-sample MVD precision is used for normal AMVP CU. The same second flag is used to indicate whether integer-luma-sample or 1/16 luma-sample MVD precision is used for affine AMVP CU. In order to ensure the reconstructed MV has the intended precision (quarter-luma-sample, interger-luma-sample or four-luma-sample), the motion vector predictors for the CU will be rounded to the same precision as that of the MVD before being added together with the MVD. The motion vector predictors are rounded toward zero (that is, a negative motion vector predictor is rounded toward positive infinity and a positive motion vector predictor is rounded toward negative infinity).

The encoder determines the motion vector resolution for the current CU using RD check. To avoid always performing CU-level RD check three times for each MVD resolution, in VTM5, the RD check of MVD precisions other than quarter-luma-sample is only invoked conditionally. For normal AVMP mode, the RD cost of quarter-luma-sample MVD precision and integer-luma sample MV precision is computed first. Then, the RD cost of integer-luma-sample MVD precision is compared to that of quarter-luma-sample MVD precision to decide whether it is necessary to further check the RD cost of four-luma-sample MVD precision. When the RD cost for quarter-luma-sample MVD precision is much smaller than that of the integer-luma-sample MVD precision, the RD check of four-luma-sample MVD precision is skipped. For affine AMVP mode, if affine inter mode is not selected after checking rate-distortion costs of affine merge/skip mode, merge/skip mode, quarter-luma sample MVD precision normal AMVP mode and quarter-luma sample MVD precision affine AMVP mode, then 1/16 luma-sample MV precision and 1-pel MV precision affine inter modes are not checked. Furthermore affine parameters obtained in quarter-luma-sample MV precision affine inter mode is used as starting search point in 1/16 luma-sample and quarter-luma-sample MV precision affine inter modes.

2.1.7 Motion Field Storage

In VTM5, the highest precision of explicitly signalled motion vectors is quarter-luma-sample. In some inter prediction modes such as the affine mode, motion vectors are derived at $1/16^{th}$-luma-sample precision and motion compensated prediction is performed at $1/16^{th}$-sample-precision. In terms of internal motion field storage, all motion vectors are stored at $1/16^{th}$-luma-sample precision.

For temporal motion field storage used by TMVP and ATVMP, motion field compression is performed at 8×8 granularity in contrast to the 16×16 granularity in HEVC.

2.2 Intra Block Copy

Intra block copy (IBC), a.k.a. current picture referencing, has been adopted in HEVC Screen Content Coding extensions (HEVC-SCC) and the current VVC test model (VTM-6.0). IBC extends the concept of motion compensation from inter-frame coding to intra-frame coding. As demonstrated in FIG. 14, the current block is predicted by a reference block in the same picture when IBC is applied. The samples in the reference block must have been already reconstructed before the current block is coded or decoded. Although IBC is not so efficient for most camera-captured sequences, it shows significant coding gains for screen content. The reason is that there are lots of repeating patterns, such as icons and text characters in a screen content picture. IBC can remove the redundancy between these repeating patterns effectively. In HEVC-SCC, an inter-coded coding unit (CU) can apply IBC if it chooses the current picture as its reference picture. The MV is renamed as block vector (BV) in this case, and a BV always has an integer-pixel precision. To be compatible with main profile HEVC, the current picture is marked as a "long-term" reference picture in the Decoded Picture Buffer (DPB). It should be noted that similarly, in multiple view/3D video coding standards, the inter-view reference picture is also marked as a "long-term" reference picture.

Following a BV to find its reference block, the prediction can be generated by copying the reference block. The residual can be got by subtracting the reference pixels from the original signals. Then transform and quantization can be applied as in other coding modes.

Figure 14:
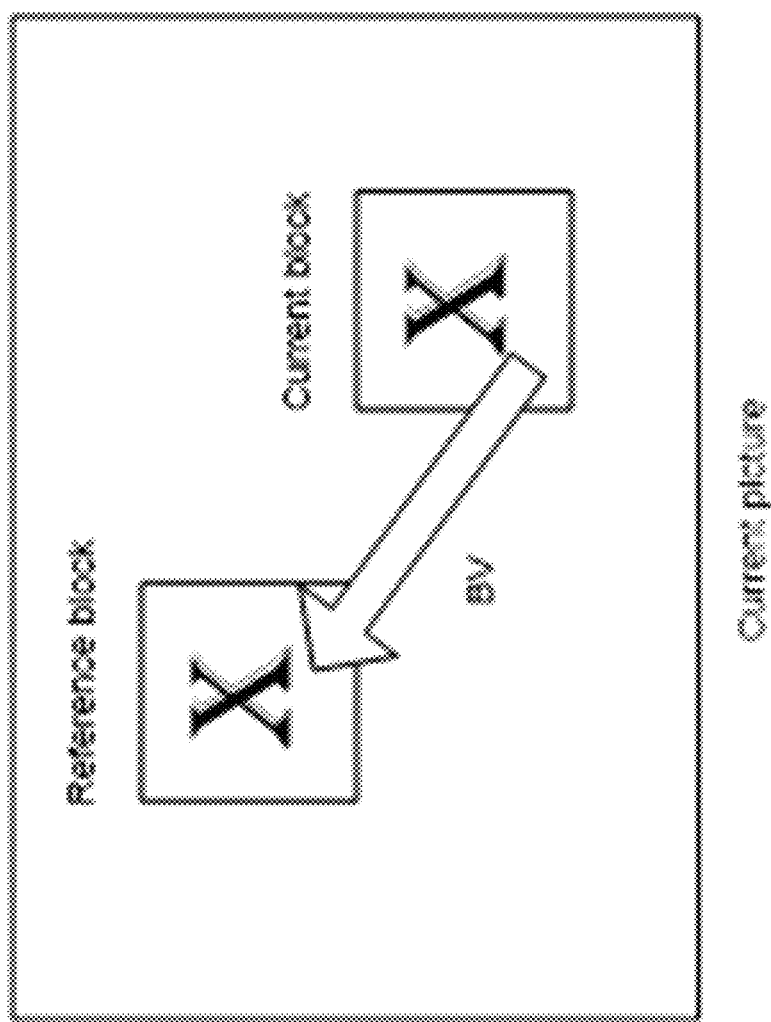
FIG. 14 is an illustration of Intra block copy coding mode.

FIG. 14 is an illustration of Intra block copy coding mode.

However, when a reference block is outside of the picture, or overlaps with the current block, or outside of the reconstructed area, or outside of the valid area restricted by some constrains, part or all pixel values are not defined. Basically, there are two solutions to handle such a problem. One is to disallow such a situation, e.g. in bitstream conformance. The other is to apply padding for those undefined pixel values. The following sub-sessions describe the solutions in detail.

2.3 IBC in HEVC Screen Content Coding Extensions

In the screen content coding extensions of HEVC, when a block uses current picture as reference, it should guarantee that the whole reference block is within the available reconstructed area, as indicated in the following spec text:

The variables offsetX and offsetY are derived as follows:

$$\text{offsetX} = (\text{ChromaArrayType} == 0) ? 0 : (mvCLX[0] \& 0x7?2:0) \quad (8\text{-}104)$$

$$\text{offsetY} = (\text{ChromaArrayType} == 0) ? 0 : (mvCLX[1] \& 0x7?2:0) \quad (8\text{-}105)$$

It is a requirement of bitstream conformance that when the reference picture is the current picture, the luma motion vector mvLX s hall obey the following constraints:

When the derivation process for z-scan order block availability as specified in clause 6.4.1 is invoked with (xCurr, yCurr) set equal to (xCb, yCb) and the neighbouring luma location (xNbY, yNbY)

set equal to (xPb+(mvLX[0]>>2)−offsetX, yPb+(mvLX[1]>>2)−offsetY) as inputs, the output shall be equal to TRUE.

When the derivation process for z-scan order block availability as specified in clause 6.4.1 is invoked with (xCurr, yCurr) set equal to (xCb, yCb) and the neighbouring luma location (xNbY, yNbY) set equal to (xPb+(mvLX[0]>>2+nPbW−1+offsetX, yPb+(mvLX[1]>>2)+nPbH−1+offsetY) as inputs, the output shall be equal to TRUE.

One or both of the following conditions shall be true:
The value of (mvLX[0]>>2)+nPbW+xB1+offsetX is less than or equal to 0.
The value of (mvLX[1]>>2)+nPbH+yB1+offsetY is less than or equal to 0.

The following condition shall be true:

$$(xPb+(mvLX[0]>>2)+nPbSw-1+offsetX)/CtbSizeY-xCb/CtbSizeY <= yCb/CtbSizeY-(yPb+(mvLX[1]>>2)+nPbSh-1+offsetY)/CtbSizeY \quad (8\text{-}106)$$

Thus, the case that the reference block overlaps with the current block or the reference block is outside of the picture will not happen. There is no need to pad the reference or prediction block.

2.4 IBC in VVC Test Model

In the current VVC test model, i.e. VTM-4.0 design, the whole reference block should be with the current coding tree unit (CTU) and does not overlap with the current block. Thus, there is no need to pad the reference or prediction block. The IBC flag is coded as a prediction mode of the current CU. Thus, there are totally three prediction modes, MODE_INTRA, MODE_INTER and MODE_IBC for each CU.

2.4.1 IBC Merge Mode

In IBC merge mode, an index pointing to an entry in the IBC merge candidates list is parsed from the bitstream. The construction of the IBC merge list can be summarized according to the following sequence of steps:
Step 1: Derivation of spatial candidates
Step 2: Insertion of HMVP candidates
Step 3: Insertion of pairwise average candidates In the derivation of spatial merge candidates, a maximum of four merge candidates are selected among candidates located in the positions depicted in FIG. 1. The order of derivation is $A_1$, $B_1$, $B_0$, $A_0$ and $B_2$. Position $B_2$ is considered only when any PU of position $A_1$, $B_1$, $B_0$, $A_0$ is not available (e.g. because it belongs to another slice or tile) or is not coded with IBC mode. After candidate at position $A_1$ is added, the insertion of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 2 are considered and a candidate is only added to the list if the corresponding candidate used for redundancy check has not the same motion information.

After insertion of the spatial candidates, if the IBC merge list size is still smaller than the maximum IBC merge list size, IBC candidates from HMVP table may be inserted. Redundancy check are performed when inserting the HMVP candidates.

Finally, pairwise average candidates are inserted into the IBC merge list.

When a reference block identified by a merge candidate is outside of the picture, or overlaps with the current block, or outside of the reconstructed area, or outside of the valid area restricted by some constrains, the merge candidate is called invalid merge candidate.

It is noted that invalid merge candidates may be inserted into the IBC merge list.

2.4.2 IBC AMVP Mode

In IBC AMVP mode, an AMVP index point to an entry in the IBC AMVP list is parsed from the bitstream. The construction of the IBC AMVP list can be summarized according to the following sequence of steps:
Step 1: Derivation of spatial candidates
  Check $A_0$, $A_1$ until an available candidate is found.
  Check $B_0$, $B_1$, $B_2$ until an available candidate is found.
Step 2: Insertion of HMVP candidates
Step 3: Insertion of zero candidates After insertion of the spatial candidates, if the IBC AMVP list size is still smaller than the maximum IBC AMVP list size, IBC candidates from HMVP table may be inserted.

Finally, zero candidates are inserted into the IBC AMVP list.

3 Examples of Technical Problems Solved by Embodiments and Techniques Described in the Present Document 1) For IBC block vector prediction, using HMVP may be simpler than merge and AMVP.
2) HMVP design can be simplified and optimized if it is only for block vector.

4 Listing of Embodiments and Techniques

The terminology "IBC" should not be interpreted in a narrow way. Any technology that uses a motion vector pointing to the same picture covering a current block could be treated as "IBC". In addition, it shouldn't be restricted to be uni-prediction.

The detailed inventions below should be considered as examples to explain general concepts. These inventions should not be interpreted in a narrow way. Furthermore, these inventions can be combined in any manner.

A function clip3(min, max, x) is defined as clip3(min, max, x)=x<min?min: (x>max?max: x). In the following, ctbSize denotes the width and/or height of a CTU/CTB and (xCb, yCb) denotes the top-left corner of a block relative to the top-left corner of a picture.

Block Vector may be abbreviated as "BV".

1. A HMVP table may contain a number of (e.g. N, N>=0 and N is an integer) block vector predictors.
   a. In one example, each entry in HMVP may only contain a pair of integers, e.g., BVx and BVy.
   b. In one example, each entry in HMVP may represent a block vector in integer precision.
   c. For example, N=1, 2, 3, 4, 5, 6, or 8.
   d. In one example, N may be signaled or derived based on other decoded information (such as how many HMVP candidates are allowed for inter mode).
   e. In one example, there may be multiple HMVP tables, and at least one specific HMVP table of them comprises only BVs (there is no MV referring to reference pictures other than the current picture in the table).
      i. In one example, the multiple HMVP tables are operated independently.

2. One or multiple entries in HMVP table may be used to predict a BV for the current block.
   a. In one example, for a block vector (BVx and BVy) and a block vector prediction (BVPx and BVPy) in HMVP, (BVx-BVPx, BVy-BVPy) may be signalled in the bitstream.
   b. In one example, the index of the block vector prediction (BVPx and BVPy) in HMVP table may be signaled.
3. The CABAC context for coding the index of HMVP for BVP may be shared with the merge index for inter mode coding
   a. In one example, the contexts for coding the index of HMVP for BVP may use the $1^{st}$ K (e.g. K=1 to 8) contexts for coding the merge index.
   b. In one example, the contexts for coding the index of HMVP for BVP may use the last K (e.g. K=1 to 8) contexts for coding the merge index.
   c. Alternatively, the contexts for coding the index of HMVP for BVP may be independent with those for coding the merge index.
4. Motion vector/block vector derived from HMVP prediction may be clipped.
   a. In one example, motion vector derived from HMVP prediction, i.e. motion vector difference plus a HMVP prediction, may be clipped to allowed motion vector range, e.g. [−32768, 32767].
5. When a HMVP table contains no entries, block vector prediction may be disallowed to be used.
   a. In one example, signaling of the HMVP index may be skipped.
   b. Alternatively, furthermore, a block vector may be directly signalled in the bitstream.
   c. Alternatively, furthermore, a default block vector may be used to predict the block vector.
      i. In one example, (0, 0) may be used to predict the block vector.
      ii. In one example, (−M, 0) may be used to predict the block vector, where M is a positive integer. E.g., M may be equal to the width of the current block.
      iii. In one example, (0, −N) may be used to predict the block vector, where N is a positive integer. E.g. N may be equal to the height of the current block.
      iv. Whether a default BV is used to predict the BV of the current block may depend on the number of entries in the HMVP table.
         1) For example, a default BV is used to predict the BV of the current block when the number of entries in the HMVP table is smaller than K. e.g. K=1 or 2.
6. A HMVP table may be initialized with multiple constant block vectors (a.k.a., default BVs).
   a. In one example, (−M*idx, 0) may be set as an initial value for the entry with index equal to idx in HMVP wherein M is an integer value.
   b. In one example, (M*idx, 0) may be set as an initial value for the entry with index equal to idx in HMVP wherein M is an integer value.
   c. In one example, (0, −N*idx) may be set as an initial value for the entry with index equal to idx in HMVP wherein N is an integer value.
   d. In one example, M and/or N mentioned above may be pre-defined or adaptively changed from one video unit to another video unit.
      i. In one example, M and/or N may be dependent on coded information.
   e. In one example, the default BVs may be defined to be (0, −16) (0, −12) (0, −8) (0, −4) (−16, 0) (−12, 0) (−8, 0) (−4, 0).
   f. In one example, for a certain index, one of the above methods may be used to initialize the entry.
   g. In one example, the HMVP table may be initialized before encoding or decoding a sequence/picture/slice/tile group/tile/brick/sub-picture/CTU row/CTU.
7. A default process may be invoked when the decoded HMVP index is no smaller than the length of HMVP list, i.e. the number of available MV in the list.
   a. In one example, the block vector prediction may be set as (0,0) when the decoded index is no smaller than the length of HMVP list.
   b. In one example, the block vector prediction may be set as (−M, 0), where M is a positive integer, e.g., M may be equal to the width of the current block, when the decoded index is no smaller than the length of HMVP list.
   c. In one example, the block vector prediction may be set as (0, −N), where N is a positive integer, e.g., M may be equal to the height of the current block, when the decoded index is no smaller than the length of HMVP list.
   d. In one example, the block vector prediction may be set as (M, 0), where M is a positive integer, e.g., M may be equal to the width of the current block, when the decoded index is no smaller than the length of HMVP list.
   e. In one example, a default prediction mode, e.g. using mid-grey value to predict the whole block, may be used when the decoded index is no smaller than the length of HMVP list.
8. The maximum value for binarization of the index of HMVP in the bitstream may depend on the number of block vectors that have been considered as a HMVP entry.
   a. In one example, the number of block vectors that have been considered as a HMVP entry may be set equal to how many times that the HMVP table was updated before decoding/encoding current block.
   b. In one example, binarization methods, e.g., truncated unary/truncated binary may depend on the number of block vectors that have been considered as a HMVP entry.
   c. Alternatively, the maximum value for binarization of the index of HMVP in the bitstream may depend on the number of available entries in the HMVP table.
      i. Alternatively, the maximum value for binarization of the index of HMVP in the bitstream may be a fixed number (e.g., HMVP table size) independent of the number of available entries in the HMVP table.
   d. In one example, the number may be a counter (denoted by Cnt) to count how many block vectors have been considered as a HMVP entry.
      i. In one example, after decoding a IBC coded block, Cnt may be increased by K (e.g., 1 or 0).
         1) In one example, when a block vector is sent, Cnt will be increased by 1.
         2) In one example, when a block coded in IBC AMVP mode is detected, Cnt may be increased by 1.
         3) In one example, when a non-zero block vector difference is detected, Cnt may be increased by 1.

4) In one example, if Cnt is equal to the HMVP table size/maximum number of allowed HMVP candidates in the table, Cnt may be increased by 0.
ii. In one example, the counter is reset to 0 when HMVP contains no entries.
iii. In one example, the counter may be reset before coding a new video uni.
1) In one example, the new video unit is a new CTU row.
2) In one example, the new video unit is a new slice/tile/brick/subpicture/VPDU/CTU/a subregion of a picture.
e. In one example, the maximum value for binarization of the index of HMVP may be min(counter, LEN) where counter is the number described above and LEN denotes the maximum size of the HMVP table.
9. Block vector prediction (predictors) may be modified before it is used to predict a block vector.
a. In one example, a block vector may be modified to be a valid block vector for the current block.
b. In one example, an invalid block vector may not be used as the block vector prediction.
c. In one example, a block vector may be modified to be within the current CTU/CTB when the reference area is one CTU/CTB.
i. In one example, for a block (xCb, yCb) and block vector prediction (BVPx, BVPy), a modified block vector prediction (BVPMx, BVPMy) may be generated as BVPMx=clip3(xCb/ctbSize*ctbSize, xCb/ctbSize*ctbSize+ctbSize, xCb+BVPx)−xCb and BVPMy=clip3(yCb/ctbSize*ctbSize, yCb/ctbSize*ctbSize+ctbSize, yCb+BVPy)−yCb.
d. In one example, BVt=f(BV1, BV2, ..., BVn) may be used as the BV prediction, where BV1, BV2, BVn are entries in the HMVP table, f is a function such as average( ), max( ), min( ), middle( ), etc., and n is an integer larger than 0.
10. Block vector prediction (predictor) in a HMVP table may be used to represent the block vector of the current block.
a. In one example, an index may be signalled in the bitstream to indicate which block vector prediction (predictor) in the HMVP is used as the block vector for the current block.
i. In one example, one index must correspond to one and only one entry in the HMVP table.
1) In one example, the maximum index is equal to N−1, where N is the number of available entries of the HMVP table.
2) In one example, if the index is larger than N−1, where N is the number of available entries of the HMVP table, the BV prediction is set to be a default BV, such as those defined in bullet 4.
3) In one example, the decoded index k may be corresponding to the (M−1−k)-th entry in the HMVP table.
a. Alternatively, the decoded index k may be corresponding to the k-th entry in the HMVP table.
b. In one example, a constant block vector difference may be applied when HMVP is used to predict block vectors.
i. In one example, block vector difference being (0,0) may be always applied to HMVP entries.
c. In one example, indication of whether there is non-zero block vector differences may be signaled for a CU/PU/block.
i. Alternatively, furthermore, the block vector differences may be signaled only when it indicates that there is non-zero block vector differences.
d. In one example, which block vector predictions from the HMVP table can be used may be dependent on the indication of whether there is non-zero block vector differences may be signaled for a CU/PU/block.
11. Whether and how to apply the proposed methods may depend on coding information, such as the dimensions of the block.
12. Whether and how to apply the proposed methods may be signaled from the encoder to the decoder, such as at sequence level (e.g. SPS or sequence header), picture level (e.g. picture header or PPS), slice level (e.g. slice header), tile group level, tile level, CTU row level, CTU level, etc.

General Usage of HMVP for Inter/IBC or Other Coding Methods

13. When a HMVP table is reset (e.g., before decoding a new slice/tile/brick/subpicture/CTU row/CTU), the counter associated with the HMVP table which represents the number of available entries (available HMVP candidates in the table) may be reset to K wherein K is unequal to 0.
a. In one example, K is dependent on the number of default HMVP candidates to be added to a HMVP table (e.g., equal to) during being reset.
b. In one example, K is dependent on the maximum number of HMVP candidates in the HMVP table (e.g., equal to).

5 Embodiment 5.1 Embodiment #1

This embodiment indicates how the syntax is designed to use HMVP for BV coding. It is based on the latest VVC draft, i.e. JVET-O2001-vE. The changes are highlighted in bold and italic. Deleted texts are marked with double brackets (e.g., [[a]] denotes the deletion of the character "a").

| | Descriptor |
|---|---|
| coding_unit( x0, y0, cbWidth, cbHeight, cqtDepth, treeType, modeType ) { | |
| ... | |
|   if( cu_skip_flag[ x0 ][ y0 ] = = 0 ) | |
|     general_merge_flag[ x0 ][ y0 ] | ae(v) |
|   if( general_merge_flag[ x0 ][ y0 ] ) { | |
|     merge_data( x0, y0, cbWidth, cbHeight, chType ) | |
|   } else if ( CuPredMode[ chType ][ x0 ][ y0 ] = = MODE_IBC ) { | |
|     mvd_coding( x0, y0, 0, 0 ) | |

-continued

| | Descriptor |
|---|---|
| [[if( MaxNumIbcMergeCand > 1 ) | |
|   mvp_l0_flag[ x0 ][ y0 ]]] | [[ae(v)]] |
| if( NumHmvplbcCand!=0) | |
|   bvp_idx[x0][y0] | ae(v) |
| if( sps_amvr_enabled_flag && | |
|   ( MvdL0[ x0 ][ y0 ][ 0 ] != 0 \|\| MvdL0[ x0 ][ y0 ][ 1 ] != 0 ) ) { | |
|   amvr_precision_idx[ x0 ][ y0 ] | ae(v) |
| } | | bvp_idx uses the truncated Rice (TR) binarization process with cMax=MaxNumHBVPCand−1, cRiceParam=0.
MaxNumHBVPCand is the Maximum Length of the HMVP for IBC Table.

8.6.2.1 General
Inputs to this process are:
- a luma location (xCb, yCb) of the top-left sample of the current luma coding block relative to the top-left luma sample of the current picture,
- a variable cbWidth specifying the width of the current coding block in luma samples,
- a variable cbHeight specifying the height of the current coding block in luma samples.

Outputs of this process are:
- the luma block vector in [[1/16 fractional]] integer sample accuracy bvL.

The luma block vector mvL is derived as follows:
[[The derivation process for IBC luma block vector prediction as specified in clause 8.6.2.2 is invoked with the luma location (xCb, yCb), the variables cbWidth and cbHeight inputs, and the output being the luma block vector bvL.]]
bvL is set as HmvplbcCandList[MaxNumHBVPCand−bvp_idx[xCb, yCb]
When general_merge_flag[xCb][yCb] is equal to 0, the following applies:
1. The variable bvd is derived as follows:

$$bvd[0]=MvdL0[xCb][yCb][0] \quad (8\text{-}900)$$

$$bvd[1]=MvdL0[xCb][yCb][1] \quad (8\text{-}901)$$

2. The rounding process for motion vectors as specified in clause 8.5.2.14 is invoked with mvX set equal to bvL, rightShift set equal to AmvrShift, and leftShift set equal to AmvrShift as inputs and the rounded bvL as output.
3. The luma block vector bvL is modified as follows:

$$u[0]=(bvL[0]+bvd[0]+2^{18})\%2^{18} \quad (8\text{-}902)$$

$$bvL[0]=(u[0]>=2^{17})?(u[0]-2^{18}): u[0] \quad (8\text{-}903)$$

$$u[1]=(bvL[1]+bvd[1]+2^{18})\% 2^{18} \quad (8\text{-}904)$$

$$bvL[1]=(u[1]>=2^{17})?(u[1]-2^{18}): u[1] \quad (8\text{-}905)$$

NOTE 1—The resulting values of bvL[0] and bvL[1] as specified above will always be in the range of $-2^{17}$ to $2^{17}-1$, inclusive.
When IsInSmr[xCb][yCb] is equal to false, the updating process for the history-based block vector predictor list as specified in clause 8.6.2.6 is invoked with luma block vector bvL.

8.6.2.6 Updating Process for the History-Based Block Vector Predictor Candidate List
Inputs to this process are:
- luma block vector bvL in [[1/16 fractional]] integer sample accuracy.

The candidate list HmvplbcCandList is modified by the following ordered steps:
1. The variable identicalCandExist is set equal to FALSE and the variable removeIdx is set equal to 0.
2. When NumHmvplbcCand is greater than 0, for each index hMvpIdx with hMvpIdx=0 . . . NumHmvplbcCand−1, the following steps apply until identicalCandExist is equal to TRUE:
   When hMvpCand is equal to HmvplbcCandList[hMvpIdx], identicalCandExist is set equal to TRUE and removeIdx is set equal to hMvpIdx.
3. The candidate list HmvplbcCandList is updated as follows:
   If identicalCandExist is equal to TRUE or NumHmvplbcCand is equal to [[5]] MaxNumHBVPCand, the following applies:
     For each index i with i=(removeIdx+1) . . . (NumHmvplbcCand−1), HmvplbcCandList[i−1] is set equal to HmvplbcCandList[i].
     HmvplbcCandList[NumHmvplbcCand−1] is set equal to bvL.
   Otherwise (identicalCandExist is equal to FALSE and NumHmvplbcCand is less than [[5]] MaxNumHBVPCand), the following applies:
     HmvplbcCandList[NumHmvplbcCand++] is set equal to bvL.

5.2 Embodiment #2

This embodiment is based on the AVS3 draft, document number N2686. Changes are marked in bold.
7.1.2.2

| Sequence header syntax table | Descriptor |
|---|---|
| sequence_header( ) { | |
| ... | |
| num_of_hmvp_cand | u(4) |
| num_of_hbvp_cand | u(4) |

7.1.6

| Coding unit syntax table | Descriptor |
|---|---|
| coding_unit(x0, y0, width, height, mode, component) { | |
| ... | |
| if (IbcCuFlag) { | |
|   *bvp_idx* | ae(v) |
|   mv_diff_x_abs_bv | ae(v) |

7.2.2 Semantic Description of Video Sequence
7.2.2.1 Semantic Description of Video Sequence
Number of candidate history block vector information num_of_hbvp_cand
   4-bit unsigned integer.
   The value of NumOfHmvpCandIbc is equal to the value of num_of_hbvp_cand, and the value range is 0 to 15. A value of 0 for NumOfHmvpCandIbc indicates that block vector prediction based on historical information should not be used.
7.2.6 Coding Unit
Block vector prediction index bvp_idx
   The index value of the block vector prediction.
   The value of bvpidx is equal to the value of bvp_idx, and the value of bvpidx is less than the value of num_of_hbvp_cands.
8.3.4 Inverse Binarization Method
8.3.4.1 Overview

| Syntax Element | Inverse Binarization Method |
| --- | --- |
| bvp_idx | See 8.3.4.2, maxVal= NumOfHmvpCandIbc−1, the value of bvp_idx is equal to NumOfHmvpCandIbc − 1−synEIVal |

9.4 Maximum coding unit decoding
The largest decoding unit is sequentially decoded according to the raster scan order within the slice, and the decoding process is as follows:
   If the current maximum coding unit is the first maximum coding unit of the current line in the slice, initialize the value of the candidate number CntHmvp in the historical motion information table to 0, and initialize the value of the candidate number CntHmvpIbc in the historical block vector information table Is 0.
9.5.6 Intra prediction mode
9.5.6.1 Overview
When the intra prediction type of the coding unit is the normal intra prediction mode, press xxx to export the luma prediction mode and chroma prediction mode of the current coding unit; when the intra prediction type of the coding unit is block copy intra prediction, press 9.5.6.3 to derive the block vector of the current coding unit.
9.5.6.3 Block copy intra prediction mode
The block vector prediction derivation process of the block copy intra prediction mode is as follows: According to the historical block vector prediction table HmvpCandidateListIbc and the block vector prediction index bvpidx, follow the steps below to derive the historical block vector prediction value MvEPredBv:
   a) If the block vector prediction index bvpidx is less than CntHmvpIbc, the block vector prediction MvEPredBv of the current prediction unit is equal to HmvpCandidateListIbc[bvpidx].
   b) Otherwise, the block vector prediction MvEPredBv of the current prediction unit is a zero vector.

```
if( bvpidx<CntHmvpIbc)
{
   MvEPredBv(MvEPredBv_x, MvEPredBv_y) =
HmvpCandidatesListIbc[CntHmvpIbc-1-bvpidx]
   MvEPredBv_x = MvEPredBv_x << 2
   MvEPredBv_y = MvEPredBv_y << 2
}
```

-continued

```
Else
{
   MvEPredBv_x = 0
   MvEPredBv_y = 0
}
```

The block vector difference derivation process of the block copy intra prediction mode is as follows

```
MvDiffXBv = MvDiffXBv << 2
MvDiffYBv = MvDiffYBv << 2
MvDiffXBv = Clip3(−32768, 32767, MvDiffXBv)
MvDiffYBv = Clip3(−32768, 32767, MvDiffYBv)
```

Alternatively, the following may apply:

```
MvDiffXBv = MvDiffXBv << 2
MvDiffYBv = MvDiffYBv << 2
```

The block vector derivation process of the block copy intra prediction mode is as follows:

```
bvE_x = MvEPredBv_x + MvDiffXBv
bvE_y = MvEPredBv_y + MvDiffYBv
bvE_x = Clip3(−32768, 32767, bvE_x)
bvE_y = Clip3(−32768, 32767, bvE_y)
``` bvE is the block vector of the current prediction unit, and BvE is equal to bvE.
9.16 Determine the Similarities and Differences of Block Vector Information
If the two block vectors meet the following conditions, the two block vectors are different; otherwise, the two block vectors are the same:
The L0 motion vectors are not equal.
9.18 Update Historical Block Vector Prediction Information Table
After the decoding of the current prediction unit is completed, if the current prediction unit is a block copy prediction unit, when NumOfHmvpCand is greater than 0, the historical block vector prediction information table HmvpCandidateListIbc is updated according to the block vector information of the current prediction block; otherwise, the operation defined in this clause is not performed.
   a) Initialize hmvpIbcIdx to 0.
   a) If CntHmvpIbc is equal to 0, then HmvpCandidateListIbc[CntHmvpIbc] is equal to the block vector information of the current prediction unit, and CntHmvpIbc is increased by 1,
   b) Otherwise, judge whether the block vector of the current prediction block and HmvpCandidateListIbc[hmvpIdxIbc] are the same according to the method defined in 9.16:
      1) If the block vector information is the same, perform step d), otherwise, add 1 to hmvpIdxIbc.
      2) If hmvpIdxIbc is less than CntHmvpIbc, go to step c); otherwise, go to step d).
   c) If hmvpIdxIbc is less than CntHmvpIbc, then:
      1) i from hmvpIdxIbc to CntHmvpIbc−1,
         Let HmvpCandidateListIbc[i] be equal to HmvpCandidateListIbc[i+1];
      2) HmvpCandidateListIbc[CntHrnvpIbc−1] is equal to the block vector information of the current prediction unit.

Otherwise, if hmvpIdxlbc is equal to CntHmvplbc and CntHmvplbc is equal to NumOfHmvpCandlbc, then:
1) i from 0 to CntHmvplbc−1, make HmvpCandidateListlbc[i] equal to HmvpCandidateListlbc[i+1];
2) HmvpCandidateListlbc[CntHmvplbc−1] is equal to the block vector information of the current prediction unit.

Otherwise, if hmvpIdxlbc is equal to CntHmvplbc and CntHmvplbc is less than NumOfHmvpCandlbc, then HmvpCandidateListlbc[CntHmvplbc] is equal to the block vector information of the current prediction unit, and CntHmvplbc is increased by 1.

TABLE 53 ctxIdxStart and ctxIdxInc corresponding to syntax elements

| Syntax Element | ctxIdxInc | ctxIdxStart | ctx Quantity |
|---|---|---|---|
| ... | | | |
| cu_subtype_index | binIdx | 66 | 11 |
| bvp_idx | binIdx | 66 | 7 |

Figure 15:
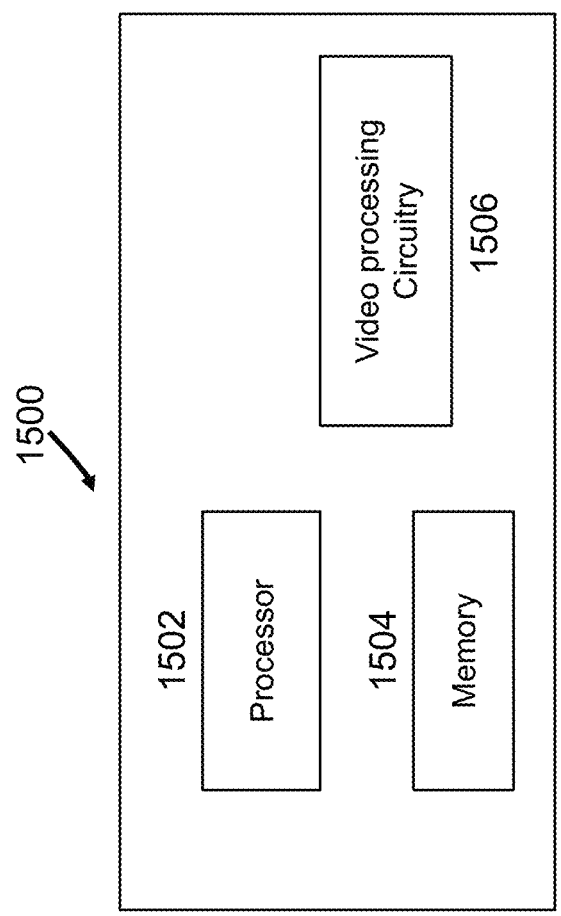
FIG. 15 is a block diagram of an example implementation of a hardware platform for video processing.

FIG. 15 is a block diagram of a video processing apparatus 1500. The apparatus 1500 may be used to implement one or more of the methods described herein. The apparatus 1500 may be embodied in a smartphone, tablet, computer, Internet of Things (IoT) receiver, and so on. The apparatus 1500 may include one or more processors 1502, one or more memories 1504 and video processing hardware 1506. The processor(s) 1502 may be configured to implement one or more methods described in the present document. The memory (memories) 1504 may be used for storing data and code used for implementing the methods and techniques described herein. The video processing hardware 1506 may be used to implement, in hardware circuitry, some techniques described in the present document. In some embodiments, the hardware 1506 may be at least partially within the processor 1502, e.g., a graphics co-processor.

Figure 17:
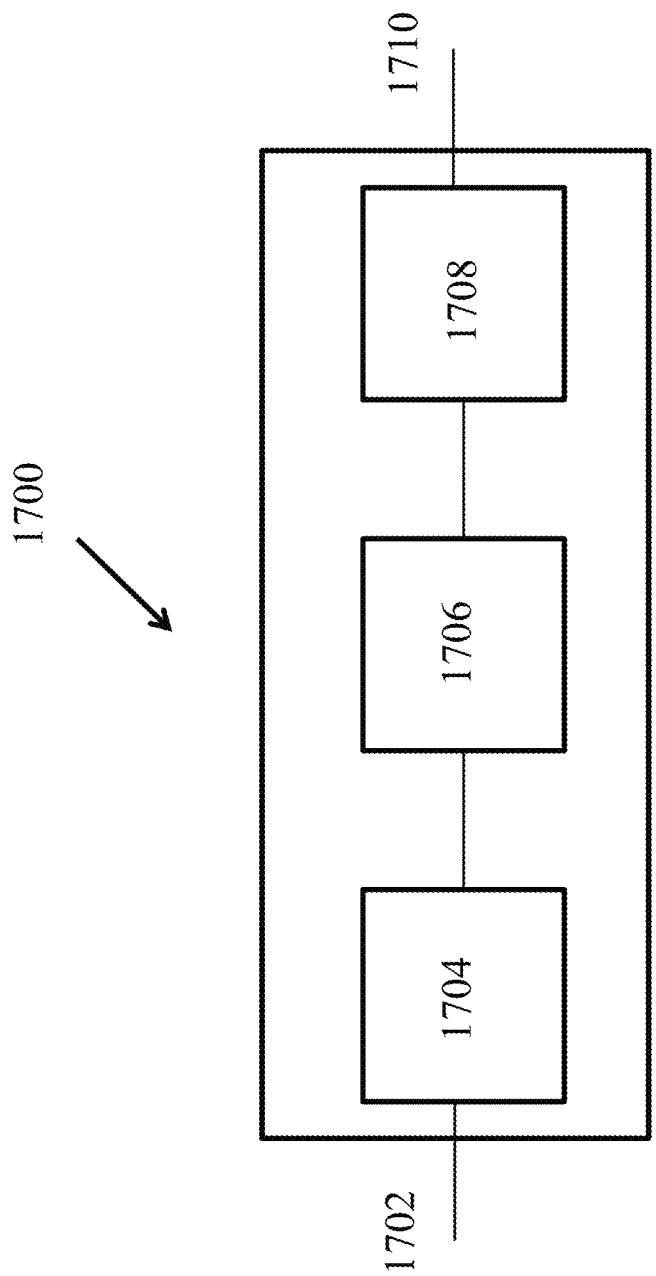
FIG. 17 is a block diagram of a system in which video processing is implemented.

FIG. 17 is a block diagram showing an example video processing system 1700 in which various techniques disclosed herein may be implemented. Various implementations may include some or all of the components of the system 1700. The system 1700 may include input 1702 for receiving video content. The video content may be received in a raw or uncompressed format, e.g., 8 or 10 bit multi-component pixel values, or may be in a compressed or encoded format. The input 1702 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1700 may include a coding component 1704 that may implement the various coding or encoding methods described in the present document. The coding component 1704 may reduce the average bitrate of video from the input 1702 to the output of the coding component 1704 to produce a coded representation of the video. The coding techniques are therefore sometimes called video compression or video transcoding techniques. The output of the coding component 1704 may be either stored, or transmitted via a communication connected, as represented by the component 1706. The stored or communicated bitstream (or coded) representation of the video received at the input 1702 may be used by the component 1708 for generating pixel values or displayable video that is sent to a display interface 1710. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was disabled based on the decision or determination.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

The following solutions may be implemented as preferred solutions in some embodiments.

Various techniques and embodiments may be described using the following clause-based format. The first set of clauses describe certain features and aspects of the disclosed techniques in the previous section.

The following clauses may be implemented together with additional techniques described in items listed in the previous section (e.g., item 1).

Figure 16:
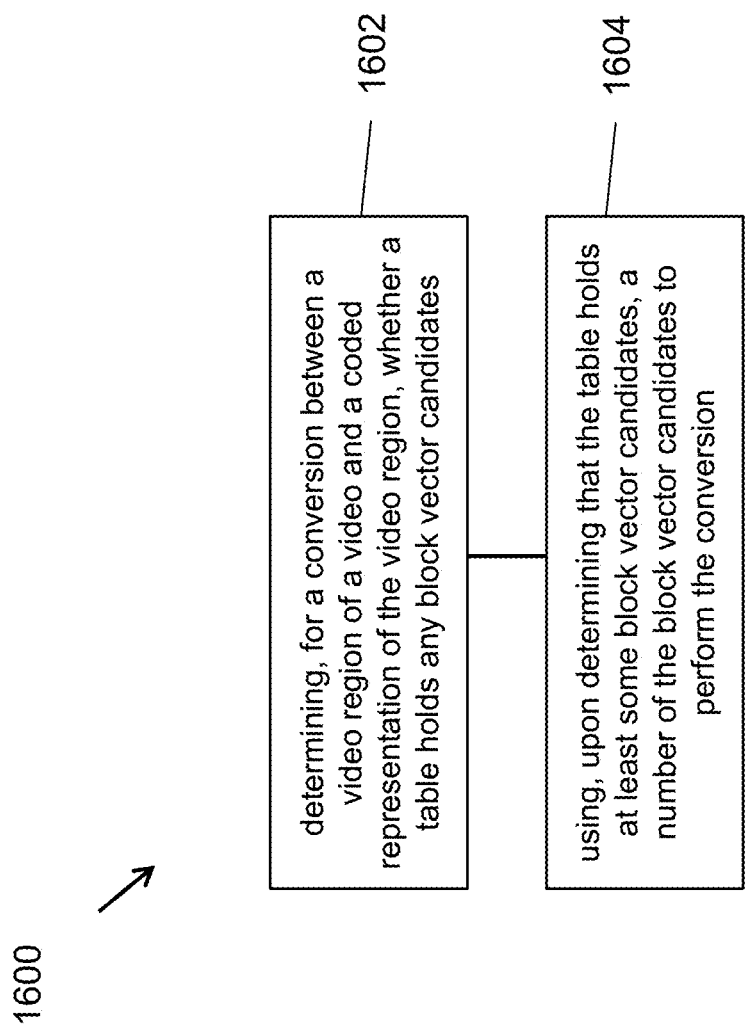
FIG. 16 is a flowchart for an example method of video processing.

1. A method of video processing (e.g., method 1600 shown in FIG. 16), comprising: determining (1602), for a conversion between a video region of a video and a coded representation of the video region, whether a table holds any block vector candidates; and using (1604), upon determining that the table holds at least some block vector candidates, a number of the block vector candidates to perform the conversion.

2. The method of clause 1, further including, performing the conversion, upon determining that the table holds zero block vector candidates, by omitting use of block vector prediction in the conversion.

3. The method of clauses 1-2, further including: updating, selectively based on a coding mode used for the conversion of the video region, the table after the conversion.

4. The method of any of clauses 1-3, wherein each block vector candidates comprises a pair of integer representing a block vector in x direction and a block vector in y direction, respectively.

5. The method of any of clauses 1-4 wherein the table is configured to hold up to N block vectors, where N is an integer that is pre-specified or signaled in the coded representation.

The following clauses may be implemented together with additional techniques described in items listed in the previous section (e.g., item 2).

6. The method of clause 1, wherein the performing the conversion includes determining a block vector predictor from block vector candidates in the table.

7. The method of clause 6, wherein the coded representation signals a difference between the block vector predictor and a block vector.

8. The method of clause 6, wherein the coded representation signals an index to an entry in the table corresponding to the block vector predictor.

The following clauses may be implemented together with additional techniques described in items listed in the previous section (e.g., item 3).

9. The method of clause 2, wherein value of a block vector for the video region is signaled in the coded representation.

10. The method of clause 1, further including: performing the conversion, upon determining that the table holds zero block vector candidates, by performing a block vector prediction in the conversion using a default block vector.

11. The method of clause 10, wherein the default block vector is (0, 0).

12. The method of clause 10, wherein the default block vector is (−M, 0), where M is a width of the video region.

The following clauses may be implemented together with additional techniques described in items listed in the previous section (e.g., item 4).

13. A method of video processing, comprising: initializing, for a conversion between a video region of a video and a coded representation of the video region, a table by adding multiple constant block vectors to the table; and using some of the block vectors to perform the conversion.

14. The method of clause 13, wherein a constant block vector with index idx has a value (−M*idx, 0), where M is a positive integer.

15. The method of clause 13, wherein a constant block vector with index idx has a value (M*idx, 0), where M is a positive integer.

16. The method of clause 13, wherein a constant block vector with index idx has a value (0, −N*idx), where N is a positive integer.

The following clauses may be implemented together with additional techniques described in items listed in the previous section (e.g., item 5).

17. A method of video processing, comprising: determining, for a conversion between a video region of a video and a coded representation of the video, that an index idx to a table holding N block vector candidates is idx>=N; and performing the conversion by using a default block vector prediction process due to the determining.

18. The method of clause 17, wherein the default block vector prediction process sets a block vector predictor to (0, 0) value.

19. The method of clause 17, wherein the default block vector prediction process sets a block vector predictor to (−M, 0) value, where M is a positive integer.

20. The method of clause 17, wherein the default block vector prediction process sets a block vector predictor to (0, N) value, where N is a positive integer The following clauses may be implemented together with additional techniques described in items listed in the previous section (e.g., item 6).

21. A method of video processing, comprising: performing a conversion between a coded representation of a video region of a video and pixel values of the video region using a table of block vector values indicative of previously used block vectors; wherein the coded representation includes a syntax element representing an index in the table that is considered for the conversion of the video region, wherein a maximum value of binarization of the index used for the syntax element is a function of a number of block vectors previously considered for adding to the table or a number of entries.

22. The method of clause 21, wherein the number of block vectors previously considered for adding to the table is equal to a number of times the table was updated by adding or deleting entries during the conversion of the video.

23. The method of clause 21, wherein the maximum value of binarization is a function of a number of available entries.

24. The method of clause 23, wherein the number of available entries is a counter that is changes in steps of K, where K is an integer.

The following clauses may be implemented together with additional techniques described in items listed in the previous section (e.g., item 7).

25. A method of video processing, comprising: determining, for a conversion between a video region of a video and a coded representation of the video region, a block motion vector predictor; and generating a modified block motion vector predictor by modifying the block motion vector predictor; performing the conversion using the modified block motion vector predictor.

26. The method of clause 25, wherein the modified block motion vector predictor is generated by modifying the block vector predictor to a valid value.

27. The method of clause 25, wherein the modified block motion vector predictor is generated by modifying the block vector predictor to fall within a coding tree unit of the video region.

The following clauses may be implemented together with additional techniques described in items listed in the previous section (e.g., item 8).

28. A method of video processing, comprising: selecting, for a conversion between a video region of a video and a coded representation of the video region, a block motion vector predictor from a table of previously used block motion vectors; and performing the conversion using the block motion vector predictor; wherein the block motion vector predictor is signaled in the coded representation using an index.

29. The method of clause 28, wherein the index corresponds to exactly one entry in the table.

30. The method of any of clauses 28-29, wherein the using the block motion vector predictor includes using the block vector predictor by applying a constant difference.

31. The method of clause 30, wherein the coded representation signals the constant difference that is non-zero in value.

The following clauses may be implemented together with additional techniques described in items listed in the previous section (e.g., item 11).

32. A method of video processing, comprising: resetting, for a conversion between a video region of a video and a coded representation of the video region, a table at a beginning of the conversion; and setting an indication of available entries of the table to K, where K is an integer; and using the table after the resetting to perform the conversion.

33. The method of clause 32, wherein K is unequal to zero.

34. The method of any of clauses 32-33, wherein K is based on a number of default candidates added to the table during the resetting.

35. The method of any of above clauses, wherein the video region is a coding unit of the video.

36. The method of any of above clauses, wherein the video region is a coding tree unit of the video.

37. The method of any of clauses 1 to 36, wherein the conversion comprises encoding the video into the coded representation.

38. The method of any of clauses 1 to 36, wherein the conversion comprises decoding the coded representation to generate pixel values of the video.

39. A video decoding apparatus comprising a processor configured to implement a method recited in one or more of clauses 1 to 38.

40. A video encoding apparatus comprising a processor configured to implement a method recited in one or more of clauses 1 to 38.

41. A computer program product having computer code stored thereon, the code, when executed by a processor, causes the processor to implement a method recited in any of clauses 1 to 38.

42. A method, apparatus or system described in the present document.

The second set of clauses describe certain features and aspects of the disclosed techniques in the previous section, for examples, items 1, 2, 4, 5, and 9-12.

Figure 18A:
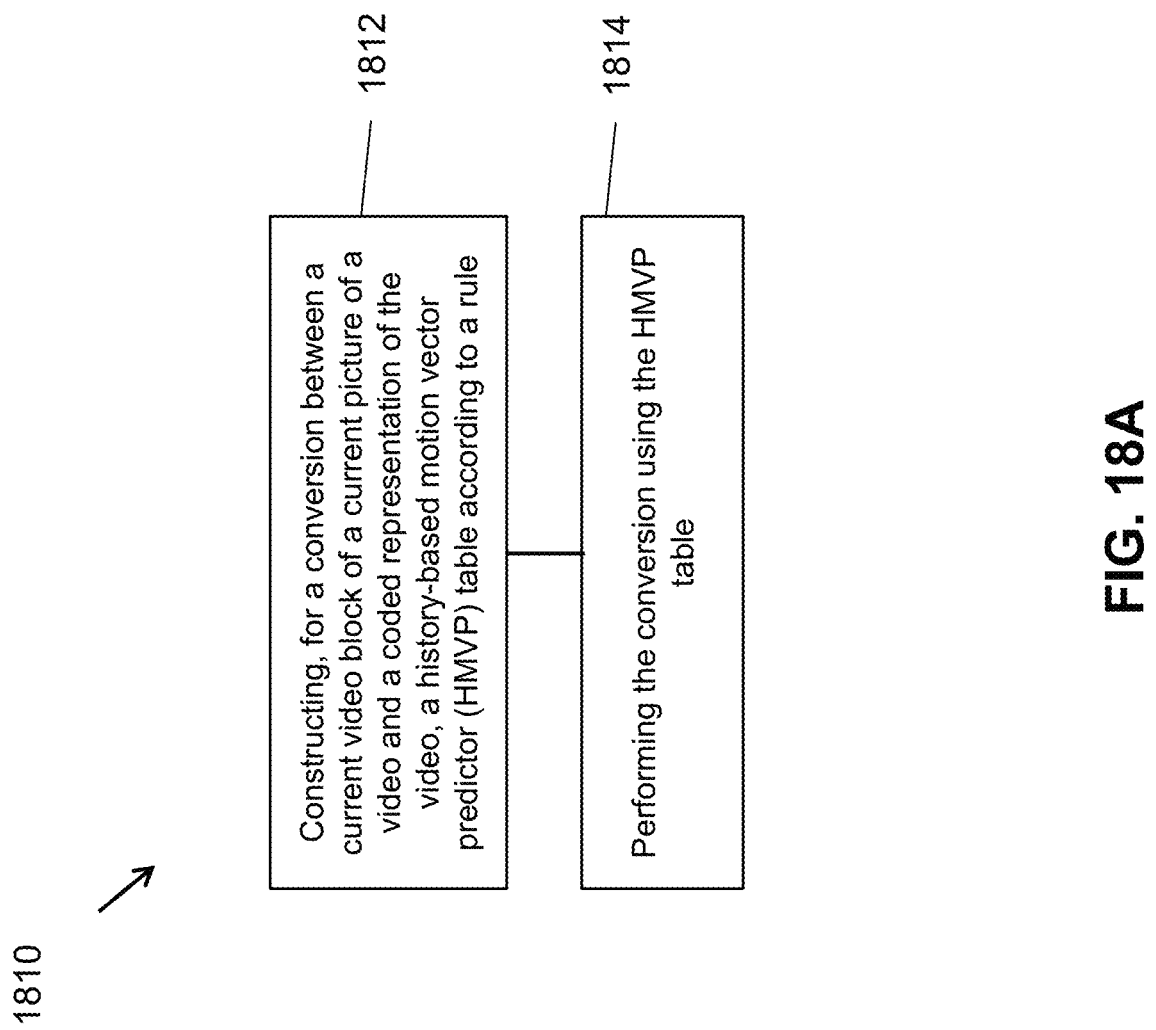
FIGS. 18A to 18F are flowcharts for example methods of video processing.

1. A method of video processing (e.g., method 1810 shown in FIG. 18A), comprising: constructing (1812), for a conversion between a current video block of a current picture of a video and a coded representation of the video, a history-based motion vector predictor (HMVP) table according to a rule, and performing (1814) the conversion using the HMVP table, wherein the current video block is coded in the coded representation using a block vector that represents a displacement between the current video block and a region in the current picture used for predicting the current video block, wherein the rule specifies that the constructing uses block vector information of previously processed video blocks in the HMVP table.

2. The method of clause 1, wherein the rule specifies that each entry of the HMVP table only contains a pair of integers, BVx and BVy, that represent a block vector in x direction and y direction, respectively.

3. The method of clause 1, wherein the rule specifies that each entry of the HMVP table represents a block vector with an integer precision.

4. The method of clause 1, wherein the rule specifies that the HMVP table includes N block vector candidates, whereby N is 1, 2, 3, 4, 5, 6, or 8.

5. The method of clause 4, wherein the rule specifies that N is an integer that is signaled in the coded representation or derived based on decoded information.

6. The method of clause 1, further comprising: maintaining an additional history-based motion vector predictor (HMVP) table, wherein at least one of the HMVP table or the additional HMVP table comprises block vectors only and without a motion vector referring to a reference picture other than the current picture.

Figure 18B:
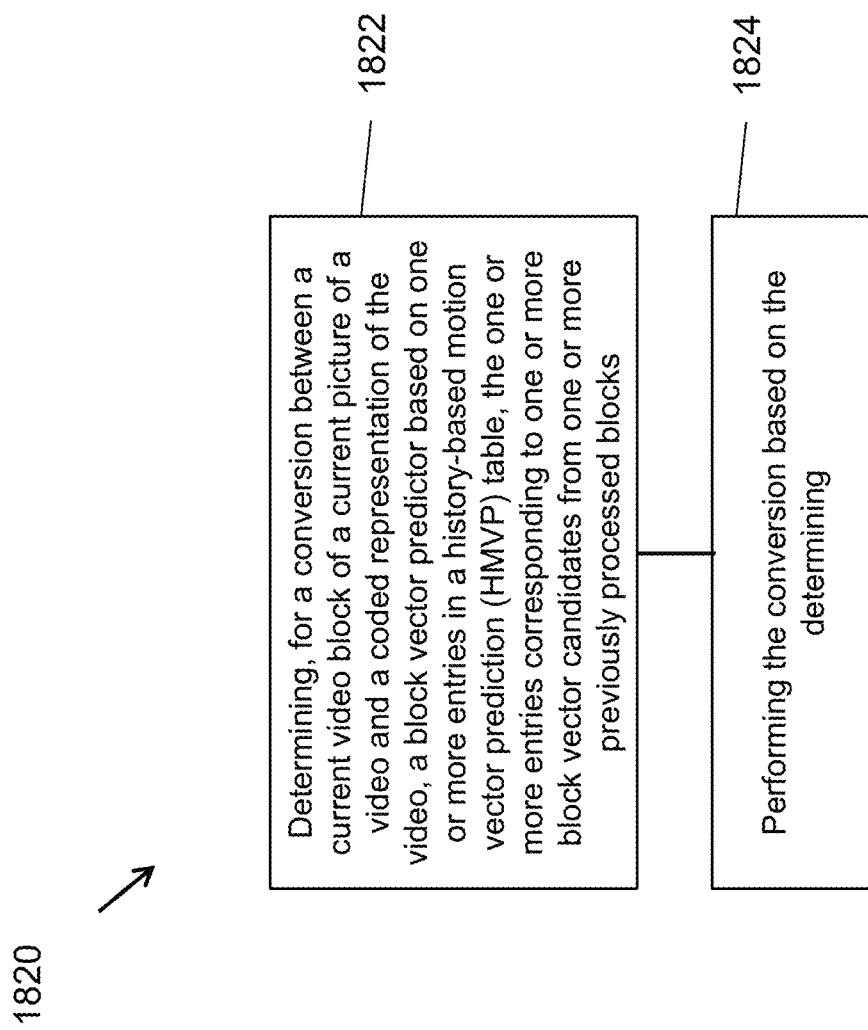

7. A method of video processing (e.g., method 1820 shown in FIG. 18B), comprising: determining (1822), for a conversion between a current video block of a current picture of a video and a coded representation of the video, a block vector predictor based on one or more entries in a history-based motion vector prediction (HMVP) table, the one or more entries corresponding to one or more block vector candidates from one or more previously processed blocks; and performing (1824) the conversion based on the determining, wherein the current video block is coded in the coded representation using a block vector that represents a displacement between the current video block and a region in the current picture used for predicting the current video block.

8. The method of clause 7, wherein the coded representation includes (BVx-BVPx, BVy-BVPy) whereby BVx and BVy represent a block vector in x direction and y direction, respectively, and BVPx and BVPy represent a block vector prediction in x direction and y direction, respectively.

9. The method of clause 7, wherein the coded representation includes an index to an entry in the HMVP table corresponding to the block vector predictor.

Figure 18C:
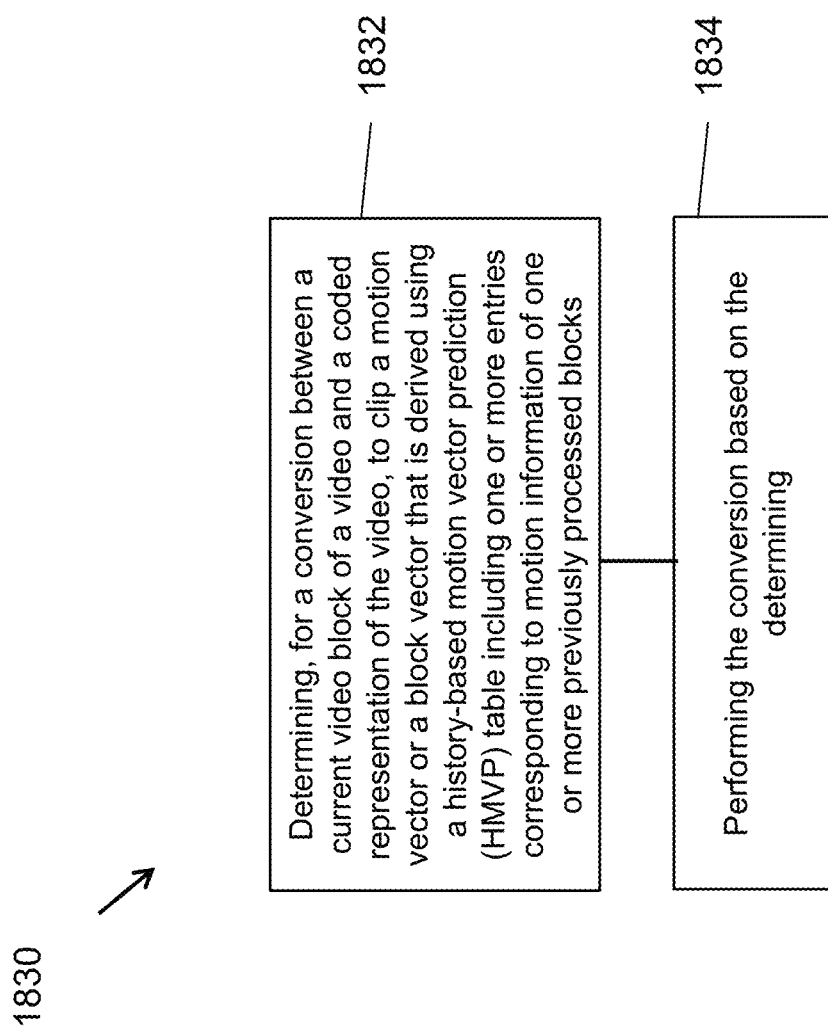

10. A method of video processing (e.g., method 1830 shown in FIG. 18C), comprising: determining (1832), for a conversion between a current video block of a video and a coded representation of the video, to clip a motion vector or a block vector that is derived using a history-based motion vector prediction (HMVP) table including one or more entries corresponding to motion information of one or more previously processed blocks; and performing (1834) the conversion based on the determining.

11. The method of clause 10, wherein the motion vector is clipped to an allowable motion vector range.

12. The method of clause 11, wherein the allowable motion vector range is [−32768, 32767].

Figure 18D:
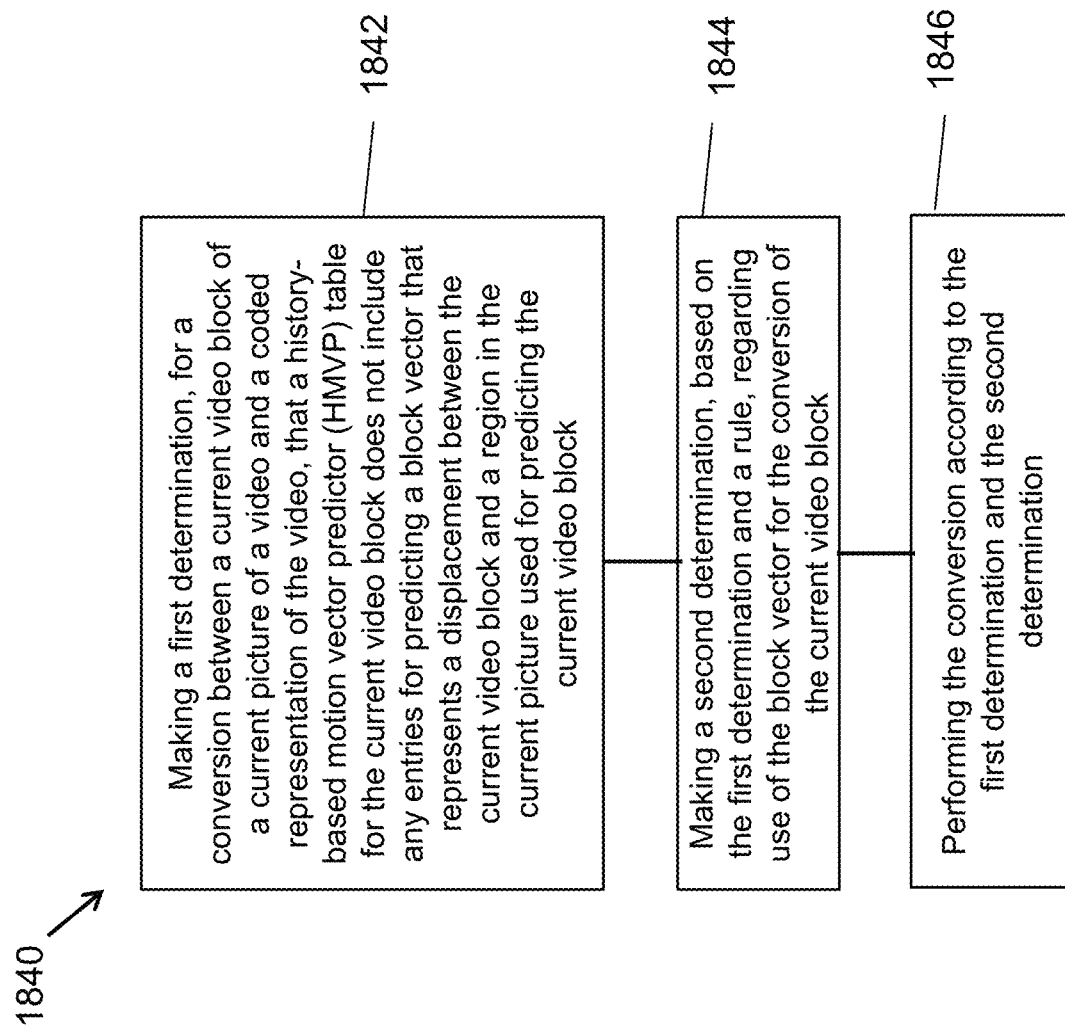

13. A method of video processing (e.g., method 1840 shown in FIG. 18D), comprising: making (1842) a first determination, for a conversion between a current video block of a current picture of a video and a coded representation of the video, that a history-based motion vector predictor (HMVP) table for the current video block does not include any entries for predicting a block vector that represents a displacement between the current video block and a region in the current picture used for predicting the current video block; making (1844) a second determination, based on the first determination and a rule, regarding use of the block vector for the conversion of the current video block; and performing (1846) the conversion according to the first determination and the second determination.

14. The method of clause 13, wherein the rule specifies that a prediction of the block vector is omitted.

15. The method of clause 14, wherein the coded representation does not include an index of the HMVP table.

16. The method of clause 13, wherein the rule specifies that the block vector is directly signaled in the coded representation.

17. The method of clause 13, wherein the rule specifies that a default block vector is used to predict the block vector.

18. The method of clause 17, wherein the default block vector has a value corresponding to (0, 0), (−M, 0), or (0, −N), where M is a positive integer and N is a positive integer.

19. The method of clause 17, wherein the rule specifies use of the default block vector based on a number of entries in the HMVP table.

Figure 18E:
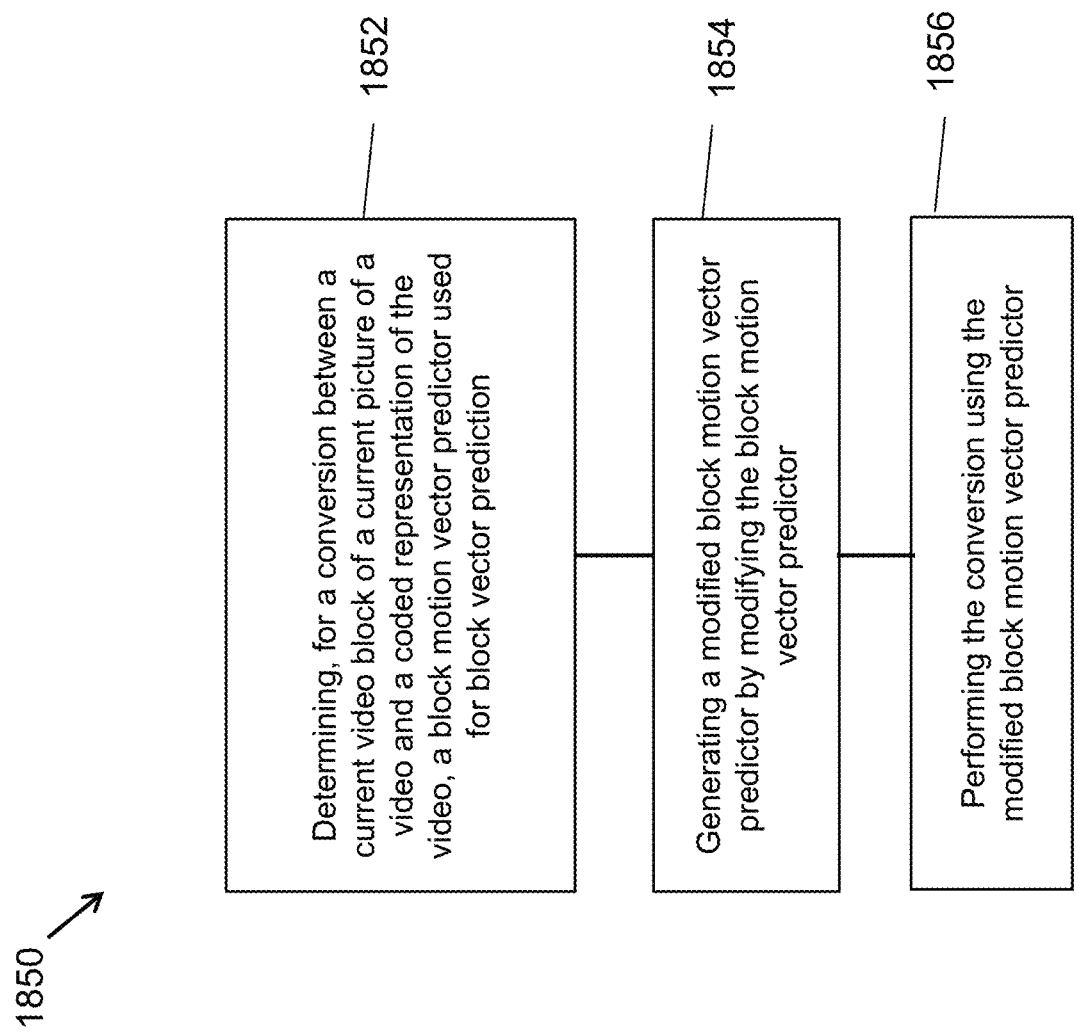

20. A method of video processing (e.g., method 1850 shown in FIG. 18E), comprising: determining (1852), for a conversion between a current video block of a current picture of a video and a coded representation of the video, a block motion vector predictor used for block vector prediction; generating (1854) a modified block motion vector predictor by modifying the block motion vector predictor; and performing (1856) the conversion using the modified block motion vector predictor, wherein the block vector prediction predicts a block vector that represents a displacement between the current video block and a region in the current picture used for predicting the current video block.

21. The method of clause 20, wherein the modified block motion vector predictor is generated by modifying the block vector predictor to a valid value.

22. The method of clause 21, wherein the generated block motion vector predictor is not used for the block vector prediction in case that the generated block motion vector predictor has an invalid value.

23. The method of clause 20, wherein the modified block motion vector predictor is generated by modifying the block vector predictor to fall within a coding tree unit of the current video block.

24. The method of clause 23, wherein the modified block vector predictor (BVPMx, BVPMy) is generated such that BVPMx=clip3(xCb/ctbSize*ctbSize, xCb/ctbSize*ctbSize+ctbSize, xCb+BVPx)−xCb and BVPMy=clip3(yCb/ctbSize*ctbSize, yCb/ctbSize*ctbSize+ctbSize, yCb+BVPy)−yCb, whereby xCb and yCb denote a sample position in the current video block in x direction and y direction, respectively, and BVPx and BVPy represent the block vector predictor in x direction and y direction, respectively, clip3(min, max, x) is defined as clip3(min, max, x)=x<min?min: (x>max?max: x), and ctbSize indicates a width and/or a height of a coding tree unit or a coding tree block of the video.

25. The method of clause 20, wherein BVt=f(BV1, BV2, . . . , BVn) is used as the block vector prediction, where BV1, BV2, BVn are entries in a history-based motion vector prediction (HMVP) table, f is a function, and n is an integer larger than 0.

Figure 18F:
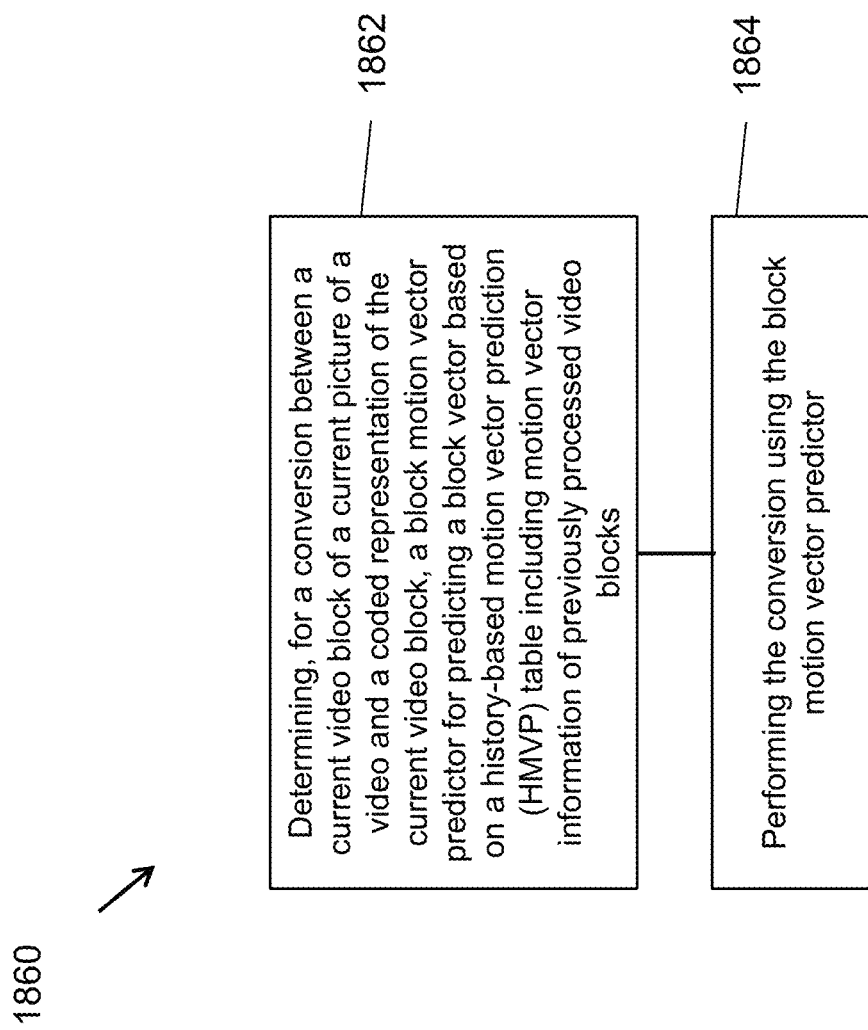

26. A method of video processing (e.g., method 1860 shown in FIG. 18F), comprising: determining (1862), for a conversion between a current video block of a current picture of a video and a coded representation of the current video block, a block motion vector predictor for predicting a block vector based on a history-based motion vector prediction (HMVP) table including motion vector information of previously processed video blocks; and performing (1864) the conversion using the block motion vector predictor, wherein the current video block is coded in the coded representation using the block vector that represents a displacement between the current video block and a region in the current picture used for predicting the current video block.

27. The method of clause 26, wherein the coded representation includes an index indicating the block motion vector predictor.

28. The method of clause 27, wherein the index corresponds to exactly one entry in the HMVP table.

29. The method of clause 27, wherein the index has a maximum value that is equal to N−1, whereby N is an integer that indicates a number of available entries of the HMVP table.

30. The method of clause 29, further comprising determining to use a default block vector for the conversion in case that the index is greater than N−1.

31. The method of clause 26, wherein a constant block vector difference is applied to entries of the HMVP table.

32. The method of clause 26, wherein the coded representation includes an indication indicative of whether there is a non-zero block vector difference.

33. The method of clause 26, wherein the coded representation includes a block vector difference that is non-zero in value.

34. The method of clause 32, wherein the determining the block motion vector is dependent on the indication indicative of whether there is a non-zero block vector difference.

35. The method of any of clauses 1 to 34, wherein the method is performed further dependent on coding information of the video.

36. The method of any of clauses 1 to 35, wherein the conversion is performed according to information signaled as at sequence level, a picture level, a slice level, a tile group level, a tile level, a coding tree unit row level, a coding tree unit level.

37. The method of any of clauses 1 to 36, wherein the performing of the conversion includes generating the coded representation from the current video block.

38. The method of any of clauses 1 to 36, wherein the performing of the conversion includes generating the current video block from the coded representation.

39. An apparatus in a video system comprising a processor and a non-transitory memory with instructions thereon, wherein the instructions upon execution by the processor, cause the processor to implement the method in any one of clauses 1 to 38.

40. A computer program product stored on a non-transitory computer readable media, the computer program product including program code for carrying out the method in any one of clauses 1 to 38.

The third set of clauses describe certain features and aspects of the disclosed techniques in the previous section, for examples, items 3, 8 and 13.

Figure 19A:
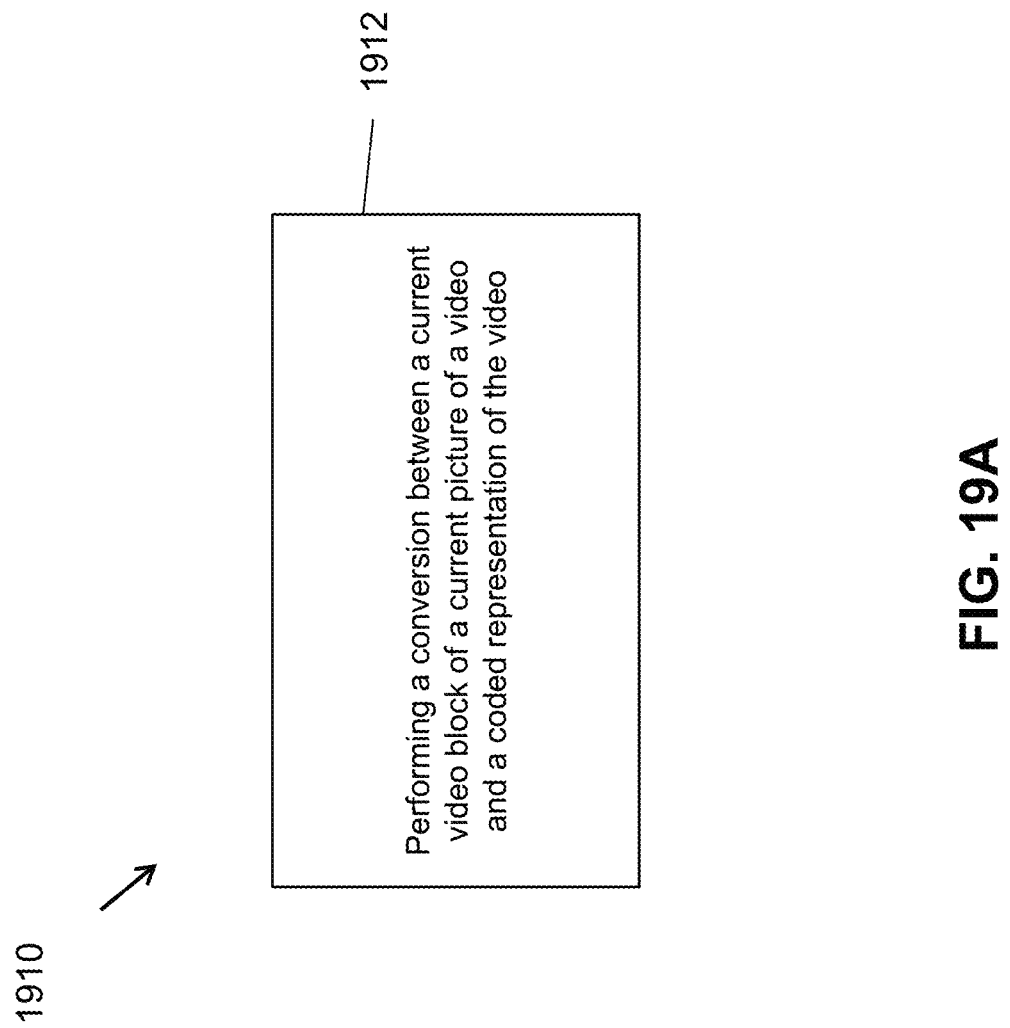
FIGS. 19A and 19B are flowcharts for example methods of video processing.

1. A method of video processing (e.g., method 1910 shown in FIG. 19A), comprising: performing (1912) a conversion between a video comprising video blocks and a coded representation of the video; wherein the coded representation conforms to a format rule, wherein the format rule specifies that context adaptive coding of a block vector predictor (BVP) index of a first video block coded using a block vector (BV) prediction mode and an index for inter mode coding used for coding a second video block is performed by sharing a same context; wherein the BVP index is to an entry in a history-based motion vector predictor list used for generating a block vector predictor for the first video block.

2. The method of clause 1, wherein the format rule further specifies that the context adaptive coding uses first K contexts for coding the merge index.

3. The method of clause 1, wherein the format rule further specifies that the context adaptive coding uses last K contexts for coding the merge index.

4. A method of video processing (e.g., method 1910 shown in FIG. 19A), comprising: performing (1912) a conversion between a video comprising video blocks and a coded representation of the video; wherein the coded representation conforms to a format rule, wherein the format rule specifies that context adaptive coding of a block vector predictor (BVP) index of a first video block coded using a block vector (BV) prediction mode is performed independently of a context used for coding an index for inter mode coding used in a second video block; wherein the BVP index is to an entry in a history-based motion vector predictor list used for generating a block vector predictor for the first video block.

5. A method of video processing (e.g., method 1910 shown in FIG. 19A), comprising: performing (1912) a conversion between a current video block of a current picture of a video and a coded representation of the video, wherein the current video block is coded in the coded representation using a block vector that represents a displacement between the current video block and a region in the current picture used for predicting the current video block, wherein the conversion is performed using a history-based motion vector prediction (HMVP) table that includes one or more previously used block vectors; wherein the coded representation includes a syntax element representing an index of an entry in the HMVP table that is applied to the current video block, wherein a maximum value of binarization of the index is determined according to a rule.

6. The method of clause 5, wherein the rule specifies that the maximum value of binarization of the index is determined as i) a function of a number of block vectors previously considered for adding to the HMVP table, ii) a number of available entries in the HMVP table, or iii) a fixed number.

7. The method of clause 6, wherein the number of block vectors previously considered for adding to the HMVP table is equal to a number of times the HMVP table was updated by adding or deleting entries during the conversion of the video.

8. The method of clause 6, wherein the binarization of the index depends on the number of block vectors previously considered for adding to the HMVP table.

9. The method of clause 6, wherein the number of block vectors previously considered for adding to the HMVP table corresponds to a counter value, Cnt, obtained by counting a number of times that the block vectors have been considered for adding to the HMVP table.

10. The method of clause 9, wherein the counter value changes by K after decoding an IBC (inter block copy) coded block of the video, where K is an integer.

11. The method of clause 9, wherein the counter value is reset to 0 in a case that the HMVP table contains no entries.

12. The method of clause 9, wherein the counter value is reset before coding a new video unit.

13. The method of clause 6, wherein the maximum value of binarization of the index is min(counter, LEN), where counter corresponds to a counter value, Cnt, obtained by counting a number of times that the block vectors have been considered for adding to the HMVP table and LEN denotes a maximum size of the HMVP table.

Figure 19B:
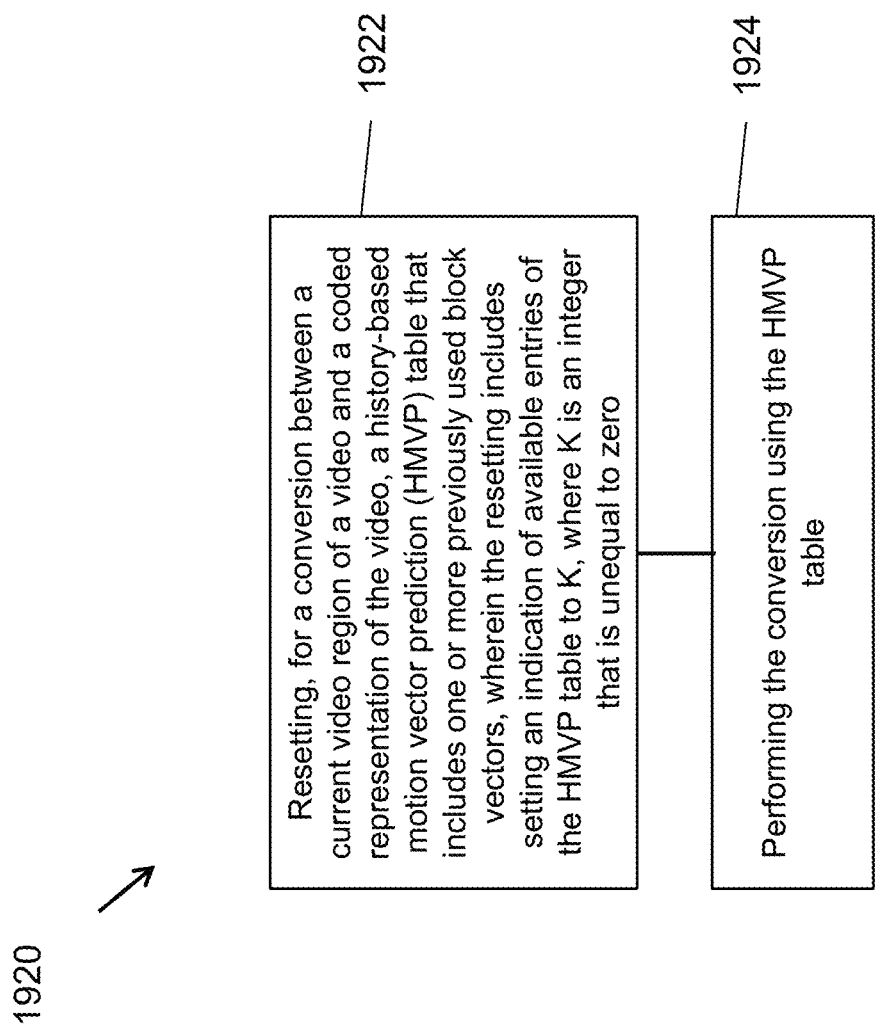

14. A method of video processing (e.g., method 1920 shown in FIG. 19B), comprising: resetting (1922), for a conversion between a current video region of a video and a coded representation of the video, a history-based motion vector prediction (HMVP) table that includes one or more previously used block vectors, wherein the resetting includes setting an indication of available entries of the HMVP table to K, where K is an integer that is unequal to zero; and performing (1924) the conversion using the HMVP table.

15. The method of clause 14, wherein K is based on a number of default candidates added to the table during the resetting.

16. The method of clause 14, wherein K is based on a maximum number of candidates in the HMVP table.

17. The method of any of clauses 1 to 16, wherein the performing of the conversion includes generating the coded representation from the video.

18. The method of any of clauses 1 to 16, wherein the performing of the conversion includes generating the video from the coded representation.

19. A video processing apparatus comprising a processor configured to implement a method recited in any one or more of clauses 1 to 18.

20. A computer readable medium storing program code that, when executed, causes a processor to implement a method recited in any one or more of clauses 1 to 18.

The fourth set of clauses describe certain features and aspects of the disclosed techniques in the previous section, for examples, items 6 and 7.

Figure 20:
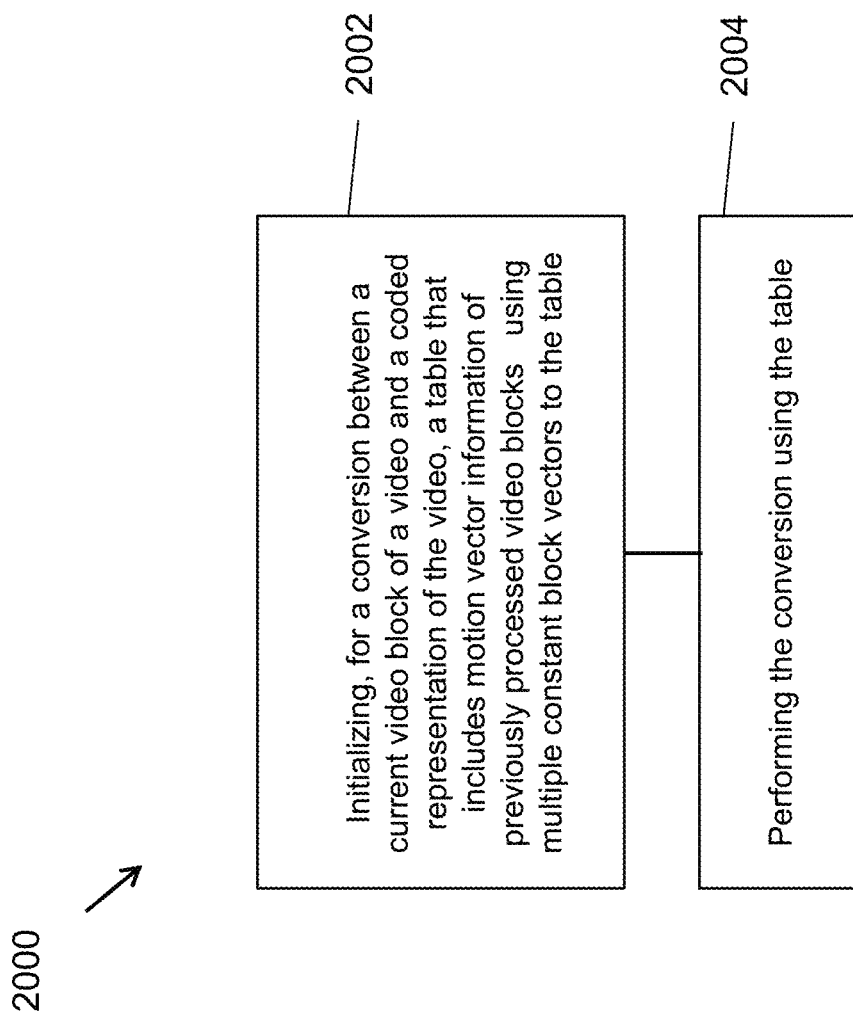
FIG. 20 is a flowchart for an example method of video processing.

1. A method of video processing (e.g., method 2000 shown in FIG. 20), comprising: initializing, for a conversion between a current video block of a video and a coded representation of the video, a table that includes motion vector information of previously processed video blocks using multiple constant block vectors to the table; and performing the conversion using the table.

2. The method of clause 1, wherein the table is a history-based motion vector predictor (HMVP) table.

3. The method of clause 1, wherein a constant block vector with an index, idx, has a value (−M*idx, 0), where M is a positive integer.

4. The method of clause 1, wherein a constant block vector with an index, idx, has a value (M*idx, 0), where M is a positive integer.

5. The method of clause 1, wherein a constant block vector with an index, idx, has a value (0, −N*idx), where N is a positive integer.

6. The method of any of clauses 3-5, wherein M and/or N is pre-defined or adaptively changed between video units of the video.

7. The method of any of clauses 3-5, wherein M and/or N is dependent on coded information of the video.

8. The method of clause 1, wherein the multiple constant block vectors are (0, −16) (0, −12) (0, −8) (0, −4) (−16, 0) (−12, 0) (−8, 0) (−4, 0).

9. The method of clause 1, wherein further comprising initializing an entry of the table for a certain index to a constant block vector.

10. The method of clause 1, wherein the initializing of the table is performed before encoding or decoding a sequence, a picture, a lice, a tile group, a tile, a brick, a sub-picture, a coding tree unit row, a coding tree unit.

11. A method of video processing (e.g., method 1910 shown in FIG. 19A), comprising: performing (1912) a conversion between a current video block of a current picture of a video and a coded representation of the video according to a rule, wherein the current video block is coded in the coded representation using a block vector that represents a displacement between the current video block and a region in the current picture used for predicting the current video block; wherein a syntax element is included in the coded representation indicating an index to a history-based motion vector predictor (HMVP) list used for the conversion, and wherein the rule specifies that, in case that the index indicated by the syntax element is no smaller than a number of entries in the HMVP list, a default process is used for determining a prediction of the block vector.

12. The method of clause 11, wherein the rule specifies that the prediction of the block vector is determined as (0, 0) in case that the index indicated by the syntax element is no smaller than the number of entries in the HMVP list.

13. The method of clause 11, wherein the rule specifies that the prediction of the block vector is determined as (−M, 0) in case that the index indicated by the syntax element is no smaller than the number of entries in the HMVP list, where M is a positive integer that indicates a width of the current block.

14. The method of clause 11, wherein the rule specifies that the prediction of the block vector is determined as (M, 0) in case that the index indicated by the syntax element is no smaller than the number of entries in the HMVP list, where M is a positive integer that indicates a width of the current block.

15. The method of clause 11, wherein the rule specifies that the prediction of the block vector is determined as (0, −N) in case that the index indicated by the syntax element is no smaller than the number of entries in the HMVP list, where N is a positive integer that indicates a height of the current block.

16. The method of clause 11, the default process uses a default prediction mode.

17. The method of any of clauses 1 to 16, wherein the performing of the conversion includes generating the coded representation from the current video block.

18. The method of any of clauses 1 to 16, wherein the performing of the conversion includes generating the current video block from the coded representation.

19. A video processing apparatus comprising a processor configured to implement a method recited in any one or more of clauses 1 to 18.

20. A computer readable medium (CRM) storing program code that, when executed, causes a processor to implement a method recited in any one or more of clauses 1 to 18. In some embodiments, the CRM may store a coded representation generated according to a method described herein.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of video processing, comprising:
   determining, for a conversion between a current video block of a video and a bitstream of the video, a first prediction mode is applied to the current video block,
   maintaining, for the first prediction mode, a first history-based motion vector predictor (HMVP) table, and
   performing the conversion based on the first prediction mode,
   wherein in the first prediction mode, a vector predictor of the current video block is determined based on the first HMVP table, and prediction samples of the current video block is obtained based on the vector predictor,
   wherein the first HMVP table comprises one or more vector predictor candidates derived from previously processed video blocks,
   wherein a number of vector predictor candidates in the first HMVP table is included in the bitstream, and
   wherein when the number of vector predictor candidates in the first HMVP table is smaller than N, the first prediction mode is disallowed for the current video block, wherein N is a predefined integer number.

2. The method of claim 1, wherein each vector predictor candidate of the first HMVP table represents a vector predictor with an integer precision.

3. The method of claim 1, wherein the first HMVP table comprises one or more block vector predictor candidates referring to a current picture and does not comprise a motion vector predictor candidate referring to a reference picture other than the current picture,
   wherein a second HMVP table is further maintained independently from the first HMVP table, and
   wherein the second HMVP table comprises one or more motion vector predictor candidates referring to a reference picture other than the current picture.

4. The method of claim 1, wherein a block vector used for obtaining prediction samples of the current video block is derived based on the vector predictor and a difference between the block vector of the current video block and the vector predictor, and wherein one or more syntax elements indicating the difference are included in the bitstream.

5. The method of claim 4, wherein a clip operation is applied to the block vector before being used for obtaining prediction samples of the current video block.

6. The method of claim 5, wherein the block vector is clipped to a range of [−32768, 32767].

7. The method of claim 4, wherein the vector predictor is modified into a valid vector before being used to derive a first vector.

8. The method of claim 7, wherein a modified vector predictor is generated by modifying the vector predictor to fall within a coding tree unit comprising the current video block.

9. The method of claim 7, wherein an invalid block vector is disallowed to be used to obtain prediction samples of the current video block.

10. The method of claim 1, wherein N=2.

11. The method of claim 1, wherein when the number of vector candidates in the first HMVP table is smaller than N, a default vector predictor is used to predict the current video block.

12. The method of claim 11, wherein the default vector predictor has a value corresponding to (0, 0).

13. The method of claim 1, wherein an index used to derive the vector predictor in the first HMVP table is included in the bitstream.

14. The method of claim 1, wherein the conversion includes encoding the current video block into the bitstream.

15. The method of claim 1, wherein the conversion includes decoding the current video block from the bitstream.

16. An apparatus for processing video data comprising a processor and a non-transitory memory with instructions thereon, wherein the instructions upon execution by the processor, cause the processor to:
   determine, for a conversion between a current video block of a video and a bitstream of the video, a first prediction mode is applied to the current video block,
   maintain, for the first prediction mode, a first history-based motion vector predictor (HMVP) table, and
   perform the conversion based on the first prediction mode,
   wherein in the first prediction mode, a vector predictor of the current video block is determined based on the first HMVP table, and prediction samples of the current video block is obtained based on the vector predictor,
   wherein the first HMVP table comprises one or more vector predictor candidates derived from previously processed video blocks,
   wherein a number of vector predictor candidates in the first HMVP table is included in the bitstream, and
   wherein when the number of vector predictor candidates in the first HMVP table is smaller than N, the first prediction mode is disallowed for the current video block, wherein N is a predefined integer number.

17. The apparatus of claim 16, wherein each vector predictor candidate of the first HMVP table represents a vector predictor with an integer precision.

18. A non-transitory computer-readable storage medium storing instructions that cause a processor to:
   determine, for a conversion between a current video block of a video and a bitstream of the video, a first prediction mode is applied to the current video block,
   maintain, for the first prediction mode, a first history-based motion vector predictor (HMVP) table, and
   perform the conversion based on the first prediction mode,
   wherein in the first prediction mode, a vector predictor of the current video block is determined based on the first HMVP table, and prediction samples of the current video block is obtained based on the vector predictor, wherein the first HMVP table comprises one or more vector predictor candidates derived from previously processed video blocks, wherein a number of vector predictor candidates in the first HMVP table is included in the bitstream, and wherein when the number of vector predictor candidates in the first HMVP table is smaller than N, the first prediction mode is disallowed for the current video block, wherein N is a predefined integer number.

19. A non-transitory computer-readable recording medium storing a bitstream of a video which is generated by a method performed by a video processing apparatus, wherein the method comprises:

determining a first prediction mode is applied to a current video block of the video, maintaining, for the first prediction mode, a first history-based motion vector predictor (HMVP) table, and generating the bitstream based on the first prediction mode, wherein in the first prediction mode, a vector predictor of the current video block is determined based on the first HMVP table, and prediction samples of the current video block is obtained based on the vector predictor, wherein the first HMVP table comprises one or more vector predictor candidates derived from previously processed video blocks, wherein a number of vector predictor candidates in the first HMVP table is included in the bitstream, and wherein when the number of vector predictor candidates in the first HMVP table is smaller than N, the first prediction mode is disallowed for the current video block, wherein N is a predefined integer number.

* * * * *